(12) United States Patent
Reich et al.

(10) Patent No.: US 12,606,973 B2
(45) Date of Patent: Apr. 21, 2026

(54) PILE INSTALLATION CONFIRMATION INSTRUMENT

(71) Applicant: ARRAY TECH, INC., Albuquerque, NM (US)

(72) Inventors: George Andrew Reich, Albuquerque, NM (US); Thierry Marin-Martinod, Chandler, AZ (US); Todd DarVel Anderson, Heber City, UT (US); Logan Herbert, Prescott, AZ (US)

(73) Assignee: ARRAY TECH, INC., Albuquerque, NM (US)

( * ) Notice: Subject to any disclaimer, the term of this patent is extended or adjusted under 35 U.S.C. 154(b) by 0 days.

(21) Appl. No.: 19/330,367

(22) Filed: Sep. 16, 2025

(65) Prior Publication Data

US 2026/0078558 A1 Mar. 19, 2026

Related U.S. Application Data

(60) Provisional application No. 63/696,525, filed on Sep. 19, 2024.

(51) Int. Cl.
| | |
|---|---|
| *E02D 13/04* | (2006.01) |
| *G01C 15/10* | (2006.01) |
| *E02D 27/42* | (2006.01) |
| *H02S 20/10* | (2014.01) |

(52) U.S. Cl.
CPC ........... *E02D 13/04* (2013.01); *G01C 15/105* (2013.01); *E02D 27/42* (2013.01); *H02S 20/10* (2014.12)

(58) Field of Classification Search
CPC ...... E02D 13/04; G01C 15/105; G01C 15/004
USPC ......................................... 33/276, 278, 286
See application file for complete search history.

(56) References Cited

U.S. PATENT DOCUMENTS

| | | | | |
|---|---|---|---|---|
| 4,681,439 | A * | 7/1987 | Shoemaker | .......... G01C 15/002 |
| | | | | 33/286 |
| 4,907,915 | A * | 3/1990 | Nicholson | .............. F24S 25/10 |
| | | | | 405/303 |
| 5,539,990 | A | 7/1996 | Le | |
| 6,052,911 | A | 4/2000 | Davis | |
| 6,823,600 | B1 | 11/2004 | Vaughan | |
| 8,684,632 | B2 * | 4/2014 | Grover | ................. G01C 15/004 |
| | | | | 405/232 |
| 9,499,953 | B2 * | 11/2016 | Grover | .................... E02D 13/04 |
| 11,299,863 | B2 * | 4/2022 | Reusing | ............. E04B 1/34352 |
| 11,598,063 | B2 * | 3/2023 | Barnes | .................... E02D 13/04 |
| 11,946,218 | B1 * | 4/2024 | Jaycox | .................... E02D 13/04 |
| 12,388,393 | B2 * | 8/2025 | Morin | .................... H02S 20/32 |

(Continued)

FOREIGN PATENT DOCUMENTS

| | | |
|---|---|---|
| CN | 206627079 U | 11/2017 |

OTHER PUBLICATIONS

European Patent Office; International Search Report and Written Opinion issued in PCT Application No. PCT/US2025/046586 dated Mar. 16, 2026.

*Primary Examiner* — George B Bennett
(74) *Attorney, Agent, or Firm* — MASCHOFF BRENNAN

(57) ABSTRACT

An instrument for ensuring proper pile installation in photovoltaic systems (PV) may include a laser assembly configured to output a first beam in a first direction and a second beam in a second direction. The second beam may indicate the angular tolerance of a torque tube. The instrument may further include a mounting interface configured to position the laser assembly on a mounting pile.

20 Claims, 14 Drawing Sheets

(56) References Cited

U.S. PATENT DOCUMENTS

| | | | | |
|---|---|---|---|---|
| 2008/0310923 | A1* | 12/2008 | Jinnings | E02D 11/00 |
| | | | | 405/232 |
| 2014/0290716 | A1* | 10/2014 | Stubbs | H02S 20/00 |
| | | | | 136/251 |
| 2015/0082720 | A1* | 3/2015 | Rodriguez | E04H 12/22 |
| | | | | 52/298 |
| 2016/0208453 | A1* | 7/2016 | Larsen | E02D 13/04 |
| 2017/0117842 | A1* | 4/2017 | Grant | F24S 25/617 |
| 2024/0210540 | A1* | 6/2024 | Zhang | G01S 17/18 |
| 2024/0344290 | A1* | 10/2024 | Gaylard | E02D 15/00 |
| 2025/0263899 | A1* | 8/2025 | Anders | E02D 5/64 |

* cited by examiner

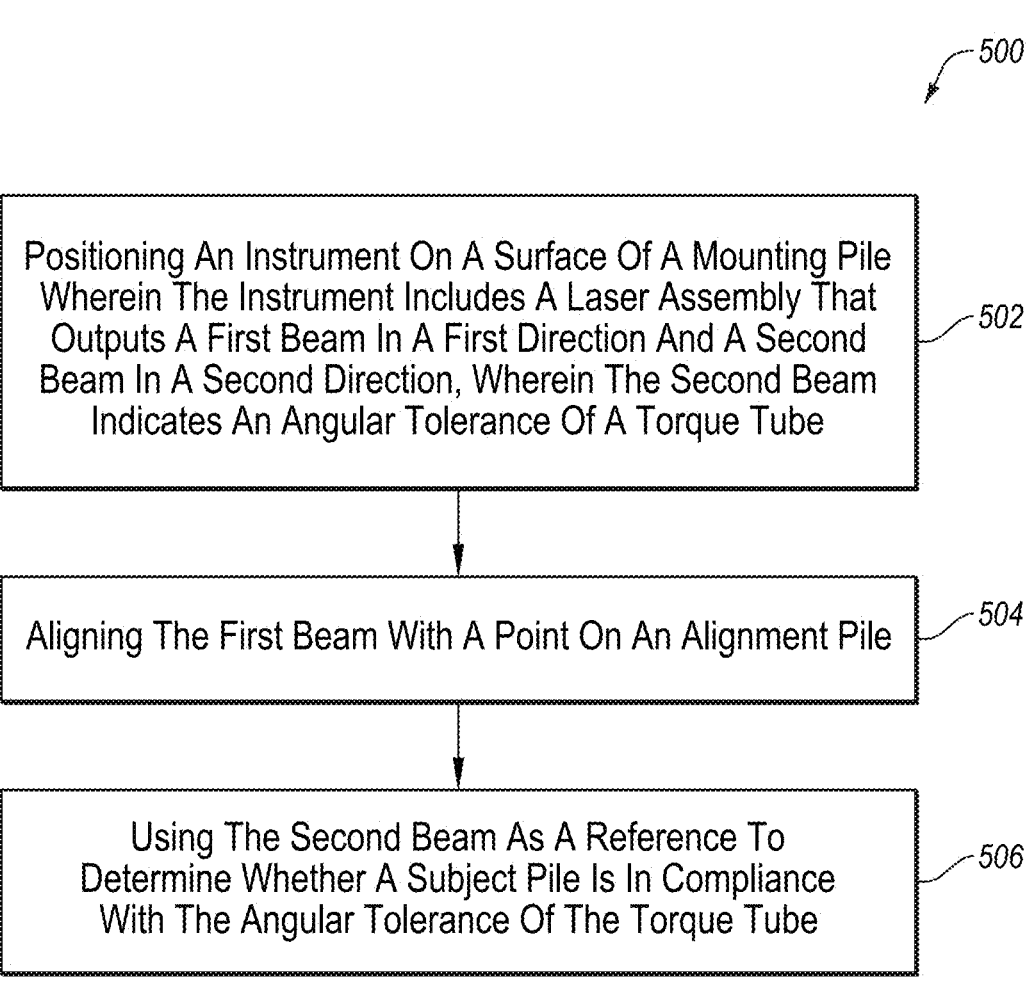

_500_

Positioning An Instrument On A Surface Of A Mounting Pile Wherein The Instrument Includes A Laser Assembly That Outputs A First Beam In A First Direction And A Second Beam In A Second Direction, Wherein The Second Beam Indicates An Angular Tolerance Of A Torque Tube

_502_

Aligning The First Beam With A Point On An Alignment Pile

_504_

Using The Second Beam As A Reference To Determine Whether A Subject Pile Is In Compliance With The Angular Tolerance Of The Torque Tube

PILE INSTALLATION CONFIRMATION INSTRUMENT

CROSS-REFERENCE TO RELATED APPLICATIONS

This patent application claims priority to and the benefit of U.S. Provisional Patent Application Ser. No. 63/696,525, entitled PILE HEIGHT CONFIRMATION INSTRUMENT, filed Sep. 19, 2024, which is incorporated by reference in its entirety.

FIELD

The present disclosure relates to solar energy production and more particularly to a method and an instrument for confirming pile installation in a photovoltaic system to ensure that any attached torque tubes are within allowable angular tolerances.

BACKGROUND

Solar installations including solar farms, photovoltaic (PV) plants, solar tracking systems, fixed solar systems, and other PV systems often include large numbers of PV modules that collect sunlight and generate energy. In solar tracking systems, PV modules are supported by horizontal support structures, or torque tubes, which rotate so that the PV modules may orient in the direction of the Sun as the Sun changes positions throughout the day. The torque tubes may be installed on piles, which may be placed at varying or consistent frequencies along the length of the solar tracking system to provide vertical support for the torque tubes and PV modules.

Because the torque tubes in solar tracking systems are often inflexible, piles must be installed such that the torque tubes are within an angular tolerance when coupled to the piles. Torque tube angular tolerances are achieved by grading the terrain on which the tracking system is installed and adjusting the piles. A pile that is vertically and/or horizontally offset from adjacent piles may cause the torque tube to be outside of its angular tolerance. As a result, the torque tube may not function properly. For example, if a torque tube is not within its angular tolerance, the torque tube may not be able to rotate, high loads may be placed on the torque tubes, motors, and/or bearings in the solar tracker system, or interferences may be developed between various components in the system—all of which may prevent the solar tracker from tracking the Sun.

Current techniques utilized to ensure proper pile installation to enable compliance with the angular tolerance of a torque tube are labor-intensive and prone to error. One technique to measure pile offsets involves actually installing a torque tube on a set of piles. Once the torque tube has been installed, an inclinometer is placed on the torque tube to measure its actual angular inconsistencies. If angular inconsistencies exceed a tolerance of the torque tube, the torque tube must be uninstalled from the piles so that pile(s) may be adjusted. This can significantly increase the cost and time to complete installation of a solar tracking system, especially if the pile installation equipment, which may be necessary to adjust piles, has been moved off-site.

In addition, inclinometer measurements on installed torque tubes lack the precision necessary to determine whether the torque tube is actually within an acceptable angular tolerance. This imprecision is due to the fact that piles are spread out along the length of a solar tracking system, and the torque tube is not constantly supported. Thus, torque tubes often sag between piles. Depending on where the inclinometer is placed on the torque tube, different angular measurements may result due to this sag. Therefore, obtaining an accurate reading may require placing the inclinometer in an exact location on the torque tube.

Another technique to measure pile offsets may include utilizing stringline between piles to take a variety of measurements to allow calculation of the angle between piles. A lookup table of appropriate offsets may then be consulted to determine whether the calculated angles are within the tolerances of the torque tubes. However, this technique is labor-intensive, cumbersome, and inefficient. Furthermore, this technique is also prone to error in that there may be errors in performing the measurement, errors in performing the calculations, or errors in utilizing the lookup table.

Accordingly, there is a need for an instrument that easily and reliably ensures proper pile installation prior to installation of a torque tube so that the torque tube, once installed, is within its angular tolerance.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used to limit the scope of the claimed subject matter.

Exemplary embodiments of the present disclosure address problems experienced in solar tracking systems, including problems associated with confirming that piles are properly installed to comply with torque tube angular tolerances. Embodiments disclosed herein address these issues by providing an instrument for ensuring proper pile installation in photovoltaic (PV) systems prior to the installation of a torque tube. Embodiments of the present disclosure include a laser assembly and a mounting interface configured to position the laser assembly on a mounting pile. The laser assembly may output a first beam in a backward direction toward an alignment pile. The laser assembly may output a second beam in a forward direction toward a subject pile, and the second beam may indicate an angular tolerance of a torque tube.

In some embodiments, the laser assembly may include a first laser that projects the first beam and the second beam. In some embodiments, the laser assembly may be configured to output the first beam as a point beam and the second beam as an area beam, and the area indicated by the area beam may indicate the angular tolerance of the torque tube. In these and other embodiments, the laser assembly may further include a lens configured to output the second beam as the area beam. For example, the lens may be an axicon lens. In these and other embodiments, the area beam may be conically shaped.

In some embodiments, the laser assembly may output a third beam in a third direction, and the second and third direction may be offset from parallel with the first direction by a combined offset amount that indicates an angular tolerance of a torque tube. Thus, the second and third beams may be offset from parallel with the backward direction of the first beam by a combined amount that is within an angular tolerance of a torque tube.

In some embodiments, the second and third directions may be offset from parallel with the first direction by the same amount. In some embodiments, the second and third directions may be offset from parallel with the first direction by a combined amount that is less than 1 degree, less than 2 degrees, or less than 3 degrees.

In these and other embodiments, the laser assembly may include a first laser configured to project an input beam and a beam splitting device that may split an input beam into the second beam and the third beam. In these and other embodiments, the beam splitting device may include a prism. In some embodiments, the first laser may project the first beam in the first direction and/or a second laser included in the laser assembly may projects the first beam in the first direction.

In some embodiments, the laser assembly may include a first laser configured to project the first beam in a first direction, a second laser configured to project the second beam in a second direction, and a third laser configured to project the third laser in a third direction.

In some embodiments, the laser assembly may include a body connected to the mounting interface and housing the first laser, the second laser, and a third laser, and the body may be configured such that the first beam may be projected through a first bore in the body, the second beam may be projected through a second bore in the body, and the third beam may be projected through a third bore in the body.

In some embodiments, the instrument may further include a scope and the laser assembly may be configured to output the second beam as a reticle that indicates the angular tolerance of the torque tube via the scope.

The instrument may facilitate confirmation that the piles in a photovoltaic system are properly installed by providing a visual confirmation that the subject pile is acceptable to comply with the angular tolerance of the torque tube. For example, the first beam may be aligned with a point on an alignment pile and the second beam and/or third beam may be used a reference to determine whether the subject pile is in compliance with the angular tolerance of the torque tube. When the subject pile is indicated by the second beam and/or third beam to not be in compliance with the angular tolerance of the torque tube, one or more of the piles may be installed improperly and one or more of the alignment pile, the subject pile height, and/or the mounting pile height may be adjusted accordingly. Thus, improper pile installation may be detected and piles may be properly installed to comply with the angular tolerance of a torque tube without actually installing a torque tube, taking measurements, or performing any calculations. Furthermore, there is less opportunity for error because the instrument may be utilized while the piles are being installed and the instrument does not require manual measurements or calculations to determine whether the subject pile is compliant with the angular tolerance of a torque tube. Thus, the instrument may improve solar tracking systems by ensuring that piles are installed within the angular tolerance of a torque tube on a variety of terrain gradients, which in turn may allow the torque tubes to effectively rotate the PV modules to track the position of the Sun throughout the day.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which:

FIG. 5 is a flowchart of an example method for ensuring proper pile installation in a PV system.

All in accordance with one or more embodiments in the present disclosure.

DETAILED DESCRIPTION

Embodiments of the present disclosure are explained with reference to the accompanying figures. It is to be understood that the figures are diagrammatic and schematic representations of such example embodiments, and are not limiting, nor are they necessarily drawn to scale. In the figures, features with like numbers indicate like structure and function unless described otherwise.

Figure 1A:
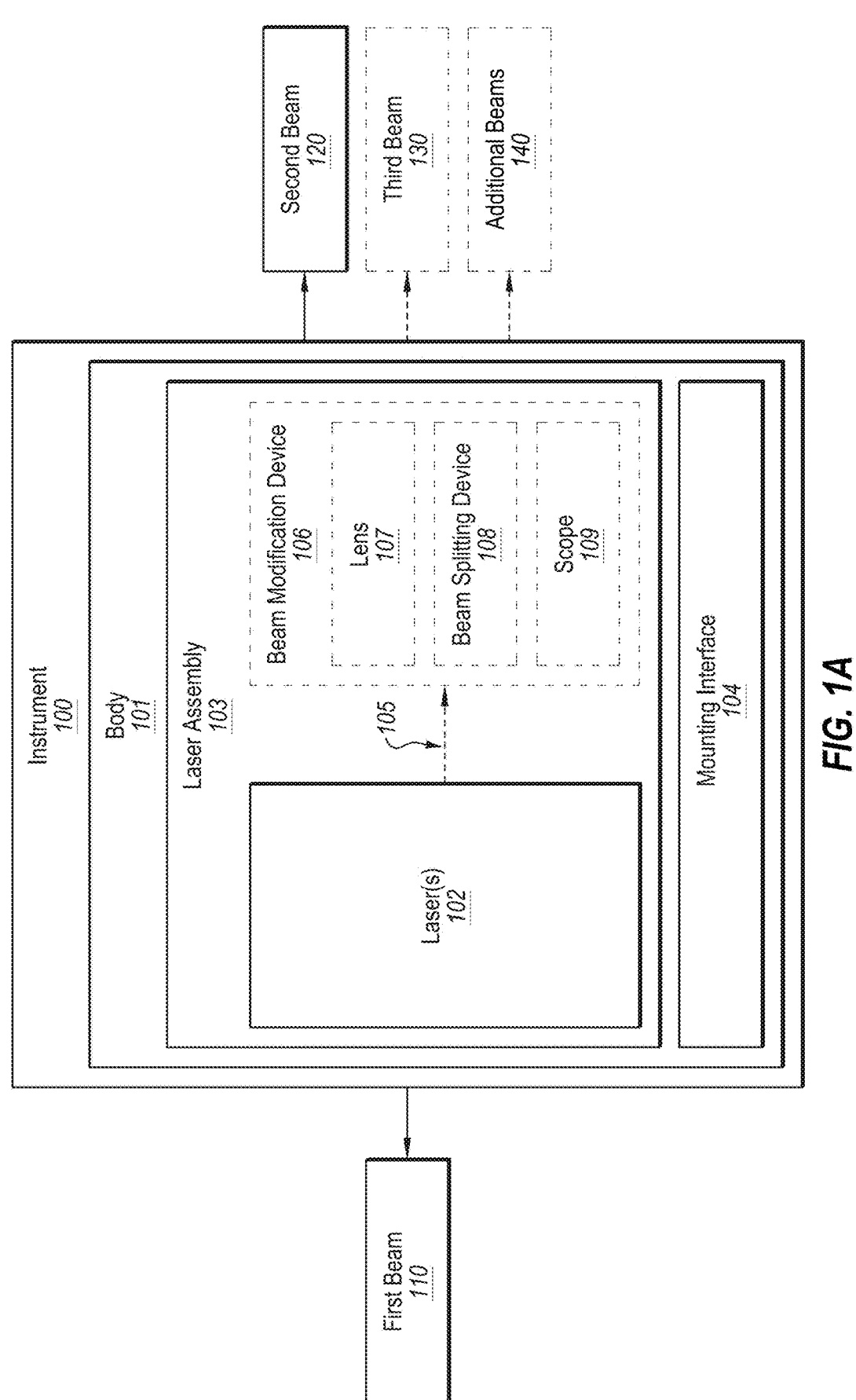
FIG. 1A illustrates an example instrument for ensuring proper pile installation in PV systems.

FIG. 1A illustrates an example instrument 100 for ensuring proper pile installation in a PV system such that the torque tube supported by the piles may be within the angular tolerance of the torque tube. The example instrument may include a laser assembly 103 that may be configured to output a first beam 110 in a first direction and a second beam 120 in a second direction. In these and other embodiments, the second beam 120 may indicate an angular tolerance of a torque tube. For example, the instrument 100 may be mounted to a mounting pile (not illustrated in FIG. 1A), the first beam 110 may be aligned with an alignment pile, and the second beam 120 may be used to determine whether a subject pile has been properly installed to comply with the angular tolerance of a torque tube. In these and other embodiments, the first direction may be a direction toward the alignment pile (e.g., a backward direction relative to the mounting pile) and the second direction may be a direction toward the subject pile (e.g., a forward direction relative to the mounting pile). The instrument 100 is described in the context of a PV system, however it will be appreciated that the instrument 100 may be used in other contexts.

In some embodiments, the laser assembly 103 may output a third beam 130 in a third direction. In these and other embodiments, the third direction may be a direction toward the subject pile (e.g., forward relative to the mounting pile). In these and other embodiments, the second direction and the third direction may be offset from parallel with the first direction by a combined offset amount that indicates an angular tolerance of the torque tube. Stated differently, the combined offset of the second beam 120 and the third beam 130 from parallel with the first beam 110 may represent the angular tolerance of the torque tube. For example, the second beam 120 may represent a first boundary of the angular tolerance of the torque tube (e.g., an upper boundary, a lower boundary, a left boundary, a right boundary, among other boundaries) and the third beam 130 may represent a second boundary (e.g., an upper boundary, a lower boundary, a left boundary, a right boundary, among other boundaries) of the angular tolerance of the torque tube. In these instances, the second beam 120 and the third beam 130 may be used to determine whether a subject pile has been installed in a sufficient manner to comply with the angular tolerance of the torque tube.

In some embodiments, the second direction and/or the third direction may be horizontally, vertically, and/or diagonally offset from parallel with the first direction. Thus, the second beam 120 and the third beam 130 may be horizontally, vertically, and/or diagonally offset from parallel with the first beam 110. In some embodiments, the second and third directions may be offset from parallel with the first direction by the same amount. In some embodiments, the second and third directions may be offset from parallel with the first direction by a combined amount that is less than 1 degree, less than 2 degrees, less than 3 degrees, and/or other amounts that may be used to indicate the angular tolerance of a torque tube.

In some embodiments, the first beam 110, the second beam 120, and/or the third beam 130 may be output as point beams, area beams, landscape beams, and/or other beam shapes and/or configurations. For example, the first beam 110, the second beam 120, and/or the third beam 130 may be output as point beams as illustrated and described with respect to FIGS. 1B and 2A-2C. As another example, the first beam 110 may be output as a point beam and the second beam 120 may be output as an area beam and the area indicated by the area beam may indicate the angular tolerance of the torque tube as illustrated and described with respect to FIGS. 1C and 3A-3E. In these and other embodiments, where one or more of the beams are output as area beams, the area beam may have a circular cross-section (e.g., conically shaped, cylindrically shaped), square cross-section, triangular cross-section, among other shapes of beams. In some embodiments, the beams may be gaussian beams.

In some embodiments, the laser assembly 103 may include one or more laser(s) 102 that may project one or more of the beams and/or an input beam 105 that may be modified to output the beams. In some embodiments, the lasers 102 may be any device capable of projecting focused light in the form of a beam. For example, the laser 102 may be a continuous-wave laser like a diode laser. In some embodiments, the laser 102 may be a point laser projecting beams as points of light or the laser 102 may be a landscape laser projecting beams as planes of light.

In some embodiments, the laser assembly 103 may include a single laser 102 that projects multiple beams. For example, the laser assembly 103 may include a first laser 102 that projects the first beam 110 in the first direction and the second beam 120 in the second direction. In some embodiments, the laser assembly 103 may include multiple lasers 102 that are each configured to project one or more of the beams. For example, the laser assembly 103 may include a first laser 102 configured to project the first beam 110 in the first direction, a second laser 102 configured to project the second beam 120 in the second direction, and a third laser 102 configured to project the third beam 130 in the third direction.

In some embodiments, the laser assembly 103 may include one or more beam modification devices 106 that may be configured to modify a beam projected by the lasers 102. In these and other embodiments, the beam modification devices 106 may include any device in which one or more output beams (e.g., the first beam 110, the second beam 120, the third beam 130, and/or additional beams 140) are different in appearance, form, shape, number, or other characteristics of the beam compared to an input beam 105. For example, the beam modification devices 106 may modify one or more input beams 105 and output the first beam 110, the second beam 120, the third beam 130, and/or additional beams 140 that may be different than the input beams 105. In some embodiments, the beam modification devices 106 may include a lens 107, a beam splitting device 108, and/or a scope 109, among other beam modification devices 106.

In some embodiments, the lens 107 may include any lens that may modify the cross-sectional shape, divergence, and/or intensity distribution of the input beams 105, among other characteristics of the input beams 105. In some embodiments, the lens 107 may include an axicon lens configured to transform input beams 105 into conically shaped beams. For example, the lens 107 may be configured to output the second beam 120 as an area beam due to the lens 107 modifying the input beam 105. In these and other embodiments, the axicon lens may include a conical optical element with a specific apex angle that may convert an input beam 105 into a ring-shaped or conical beam pattern such that the output beam (e.g., the second beam 120) may indicate the angular tolerance of a torque tube. In these and other embodiments, the lens 107 may modify the input beam 105 into an area beam (e.g., the second beam 120) with circular cross-sections that expand as the beam propagates away from the laser assembly 103. In these and other embodiments, the circular cross-section of the area beam may provide a visual indication of the angular tolerance of a torque tube. In some embodiments, the lens 107 may include a holographic lens.

In some embodiments, the beam modification devices 106 may include adjustable optical elements that allow for real-time modification of beam characteristics. In some embodiments, the beam modification devices 106 may include variable focus lenses and/or zoom lenses that enable adjustment of the area beam size based on the distance to the subject pile. In some embodiments, the beam modification devices 106 may be configured to modify the input beams 105 into landscape beam and/or area beams.

In some embodiments, the beam modification devices 106 may include a beam splitting device 108 that may be configured to split an input beam 105 into two or more beams. For example, the laser assembly 103 may include a beam splitting device 108 configured to split an input beam 105 into the second beam 120, the third beam 130, and/or additional beams 140. In these and other embodiments, the beam splitting device 108 may include one or more prisms, one or more diffractive optical elements, beam-splitters in sequence, a multi-port beam splitter, one or more holographic lenses, or any other mechanism capable of splitting a beam.

In some embodiments, the beam modification devices 106 may be configured to split an input beam 105 into two or more beams such that the two or more beams indicate the angular tolerance of a torque tube. For example, the input beam 105 may be split into the second beam 120 and the third beam 130 by a prism such that the second beam 120 and the third beam 130 may indicate the angular tolerance of a torque tube.

In some embodiments, the beam modification device 106 may include the scope 109 that may indicate the angular tolerance of a torque tube. In these and other embodiments, the laser assembly 103 may be configured to output the second beam 120 as a reticle that indicates the angular tolerance of the torque tube via the scope 109. In some embodiments, the reticle may be configured to provide visual boundaries that may correspond to the acceptable angular tolerance range for torque tube installation. In some embodiments, the reticle may have varying shapes and/or configurations to indicate the angular tolerance of the torque tube.

In some embodiments, the scope 109 may include magnification optics that may enhance the visibility of distant piles during alignment procedures. In these and other embodiments, the magnification optics may be configured to provide clear visual confirmation of beam positioning on alignment piles and subject piles. In these and other embodiments, the scope 109 may include crosshairs or other alignment indicators that may assist in positioning of the beams (e.g., first beam 110 on an alignment pile).

In some embodiments, the scope 109 may be configured to output the second beam 120 as a reticle that may provide multiple reference points within the angular tolerance range of the torque tube. The reticle may include markings that may correspond to different tolerance levels or may provide adjustment references for precise pile positioning. In these and other embodiments, the reticle may include markings that may indicate acceptable and/or unacceptable tolerance ranges.

In some embodiments, the scope 109 may be used in lieu of the lasers 102. For example, the scope 109 may be configured to provide visual alignment confirmation without beams. In these and other embodiments, the scope 109 may include a reticle (e.g., an etched reticle, an electronically produced reticle, illuminated reticle, and/or other reticles) that indicates the angular tolerance of a torque tube. The scope 109 is further described with reference to FIGS. 4A-5C.

In some embodiments, multiple beam modification devices 106 may be included in the laser assembly 103. For example, the laser assembly 103 may include the lens 107, the beam splitting device 108, and/or the scope 109.

In some embodiments, the instrument 100 may include a mounting interface 104 that may be configured to position the laser assembly 103 on the mounting pile. For example, the mounting interface 104 may be configured to couple the instrument 100 to the mounting pile.

In some embodiments, the mounting interface 104 may be configured to position the laser assembly 103 on the mounting pile such that the first beam 110 (or additional beams 140) may be output toward the alignment pile and the second beam 120 and/or the third beam 130 (or additional beams 140) may be output toward the subject pile thereby allowing the second beam 120 and/or the third beam 130 to provide a visual confirmation of whether the subject pile is installed to comply with the angular tolerance of a torque tube. In some embodiments, the mounting interface 104 may position the laser assembly 103 on the mounting pile such that the first beam 110, the second beam 120, and/or the third beam 130 are output from a height that is substantially consistent with a height of the mounting pile. In these and other embodiments, the mounting interface 104 may be selectively adjustable.

The mounting interface 104 may be any component capable of mounting and/or securing the laser assembly 103 to the mounting pile. For example, the mounting interface

104 may be an exchangeable bracket allowing the laser assembly 103 to be positioned on different sizes or types of mounting piles. In another example, the mounting interface 104 may secure the laser assembly 103 to the mounting pile via a clamp, a clip, a spring-loaded clip, a magnet, a channel, an upset, a threaded connection, or a suction cup, among other interfaces.

In some embodiments, the laser assembly 103 may be housed within a body 101. In these and other embodiments, the mounting interface 104 may form a portion of the body 101, may be housed within the body 101, and/or may be coupled to the body 101.

In these and other embodiments, the body 101 may include one or more bores that may be configured such that the beams output by the laser assembly 103 may be used in determining whether a subject pile is sufficient to comply with the angular tolerance of a torque tube. In some embodiments, the body 101 may include a first bore, a second bore, and/or a third bore. In these and other embodiments, the laser assembly 103 may include one or more lasers 102 that may be oriented with the one or more bores such that the beams output by the laser assembly 103 may be used in determining whether a subject pile has been properly installed to comply with the angular tolerance of a torque tube. For example, the body 101 may house a first laser 102 configured to project the first beam 110 in the first direction, a second laser 102 configured to project the second beam 120 in the second direction, and/or a third laser 102 configured to project the third beam 130 in the third direction, and the body 101 may be configured such that the first beam 110 may be projected though a first bore in the body 101, the second beam 120 may be projected through a second bore in the body 101, and/or the third beam 130 may be projected through a third bore in the body 101. Thus, the body 101 may be configured such that the beams are output such that the beams may be used in confirming that a subject pile has been properly installed.

Thus, the instrument 100 may allow a user to determine whether a subject pile has been properly installed such that a torque tube of a PV system may be installed and operated within the angular tolerance of the torque tube. As a result, the instrument 100 may reduce installation times, may enhance the life of torque tubes, and may reduce downtime in PV systems due to torque tube failures, among other benefits.

Modifications, additions, or omissions may be made to the instrument 100 without departing from the scope of the present disclosure. For example, in some embodiments, one or more additional beams 140 may be output by the laser assembly 103 (e.g., via one or more of the lasers 102). In some embodiments, the lasers 102 may be omitted and a scope 109 may be used without lasers 102 to visually confirm the installation of the subject pile. In some embodiments, the mounting interface 104 may be omitted and the instrument 100 may be positioned on the mounting pile without the mounting interface 104.

Figure 1B:
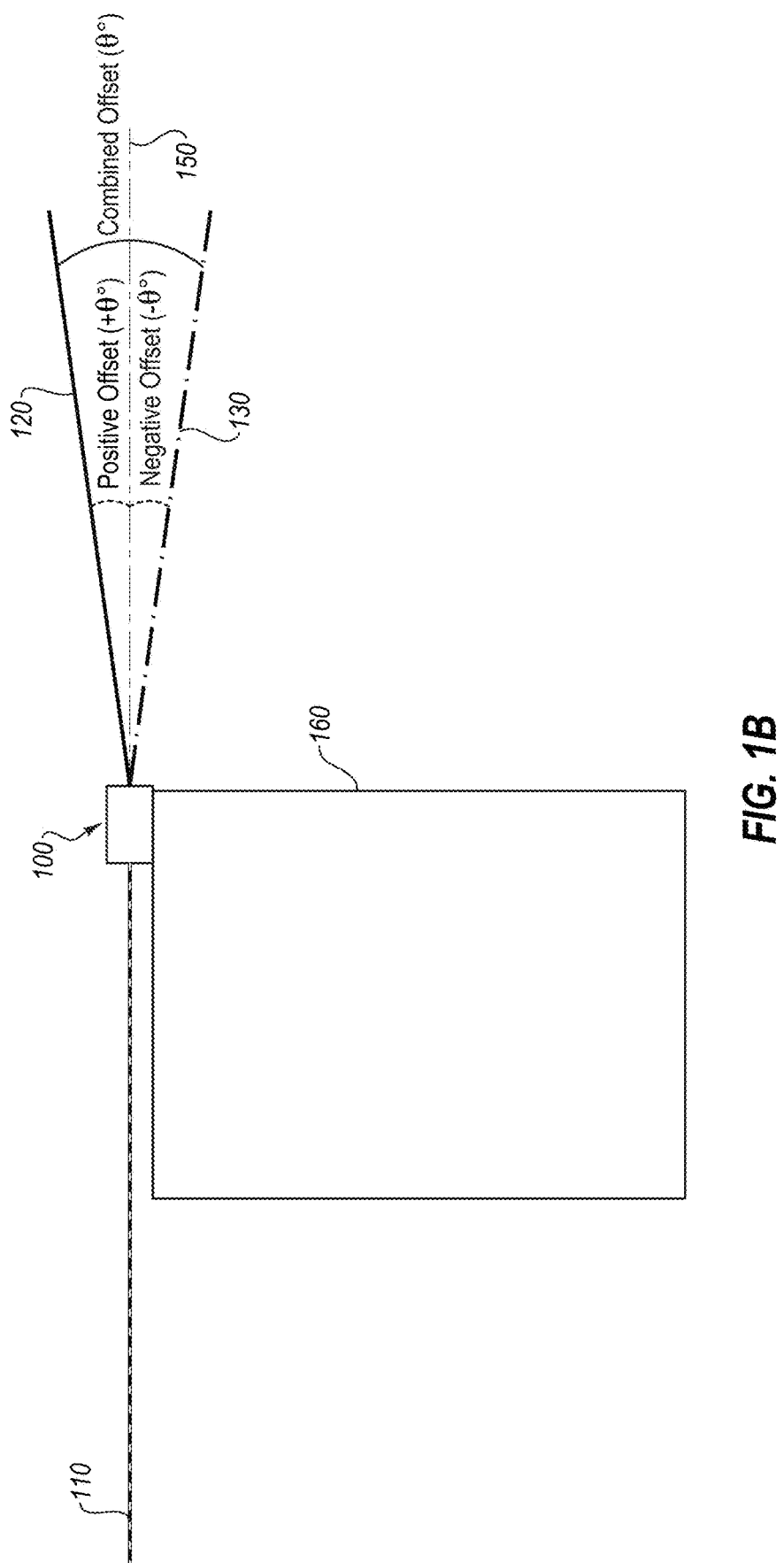
FIG. 1B illustrates the example instrument of FIG. 1A mounted to a mounting pile in which the example instrument outputs a first beam, a second beam, and a third beam.

FIG. 1B illustrates the example instrument 100 of FIG. 1A in which the example instrument 100 outputs the first beam 110, the second beam 120, and the third beam 130. Thus, FIG. 1C will be described in conjunction with FIG. 1A.

As illustrated in FIG. 1B, the example instrument 100 is mounted on a mounting pile 160 and outputs a first beam 110 in a backward direction towards an alignment pile (not shown), a second beam 120 in an upper forward direction towards a subject pile (not shown), and a third beam 130 in a lower forward direction towards the subject pile. In some embodiments, the instrument 100 may output the first beam 110, the second beam 120, and the third beam 130 through one or more lasers such as the one or more lasers 102 described with respect to FIG. 1A. For example, the lasers 102 may be any device capable of projecting focused light in the form of a beam such as a continuous-wave laser.

As described with respect to FIG. 1A, the instrument 100 may include a mounting interface 104 which may be configured to position the laser assembly 103 on the mounting pile 160 such that the first beam 110 may be output toward the alignment pile and the second beam 120 and the third beam 130 may be output toward the subject pile thereby allowing the second beam 120 and the third beam 130 to provide a visual confirmation of whether the subject pile is installed to comply with the angular tolerance of a torque tube. In some embodiments, the mounting interface 104 may position the laser assembly 103 on the mounting pile 160 such that the first beam 110, the second beam 120, and the third beam 130 are output from a point that is substantially consistent with a height of the mounting pile 160. In these and other embodiments, the mounting interface 104 may be selectively adjustable.

As described with respect to FIG. 1A, the mounting interface 104 may be any component capable of mounting and/or securing the instrument 100 to the mounting pile 160. For example, the mounting interface 104 may be an exchangeable bracket allowing the instrument 100 to be positioned on different sizes or types of mounting piles 160. In another example, the mounting interface 104 may secure the instrument 100 to the mounting pile 160 via a clamp, a clip, a spring-loaded clip, a magnet, a channel, an upset, a threaded connection, or a suction cup. In some embodiments, the mounting interface 104 may be incorporated into a tool that is used to install the mounting pile 160. In these and other embodiments, a proper height of the mounting pile 160 may be determined in real time as the mounting pile 160 is being installed between an alignment pile and a subject pile.

The mounting interface 104 may allow selective adjustment of the instrument 100 on the mounting pile 160. For example, the mounting interface 104 may be configured to allow the instrument 100 to be mounted at different positions on the mounting pile 160 so that adjustments may be made to ensure that the first beam 110 is directed backward to align with a desired location (e.g., an alignment point) on the alignment pile.

The second beam 120, which may be output in an upper forward direction, and the third beam 130, which may be output in a lower forward direction, may be offset from parallel with the first beam 110 in the backward direction by a combined amount that is within the angular tolerance of a torque tube. For example, an axis 150 may represent a colinear, parallel extension of the first beam 110. The second beam 120 may be upwardly or positively offset from the axis 150 by a fixed amount (e.g., $+\theta°$). The third beam 130 may be downwardly or negatively offset from the axis 150 by a fixed amount (e.g., $-\theta°$). The combination of the positive offset and the absolute value of the negative offset may represent an angular tolerance of a torque tube.

In some embodiments, the absolute values of the positive and negative offsets may be the same. In other embodiments, the absolute values of the positive and negative offsets may be different. For example, in some embodiments, the second beam 120 may be offset from the axis 150 by 0.5 degrees, and the third beam 130 may be offset from the axis 150 by $-0.5$ degrees. Thus, the combined offset amount of the second and third beams 120 and 130 would be 1 degree. An instrument having these angular configurations would be useful to ensure that piles are installed properly for a torque tube that has an angular tolerance of 1 degree.

The second and third beams 120 and 130 may have offsets that at any orientation, as long as their combined amount is less than or equal to an angular tolerance of a torque tube to be installed. For example, when a torque tube has an angular tolerance of less than 1 degree, a combined offset amount for the second and third beams 120 and 130 may be less than 1 degree. When a torque tube has an angular tolerance of less than 2 degrees, a combined offset amount for the second and third beams 120 and 130 may be less than 2 degrees. When a torque tube has an angular tolerance of less than 3 degrees, a combined offset amount for the second and third beams 120 and 130 may be less than 3 degrees. Specifically for a torque tube having an angular tolerance of 3 degrees, the second beam 120 may have an offset amount of 1.5 degrees and the third beam 130 may have an offset amount of $-1.5$ degrees. Offsets of the second and third beams 120 and 130 may be fixed to a combined amount that is equal to or less than any angular tolerance of a torque tube (i.e. 1, 1.5, 2, 2.5 3, 3.5, 4, 4.5, 5, . . . n degrees depending on the angular tolerance of the torque tube). Additionally or alternatively, offsets of the second and third beams 120 and 130 may be selectively adjusted such that the combined amount may be equal to or less than any angular tolerance of a torque tube. For example, the offsets of the second and the third beams 120 and 130 may be adjusted from a combined amount equating to a 2-degree angular tolerance to a combined amount equating to a 1-degree angular tolerance or vice versa.

In an example operation, the first beam 110 may be aligned with the alignment pile. In some embodiments, the first beam 110 may be aligned with a point substantially consistent with the height of the alignment pile. The second beam 120 may be output in the upper forward direction and may represent a "no-go line." Thus, when the subject pile height is above the second beam 120, the subject pile may be determined to be installed at an unacceptable height to comply with the angular tolerance of the torque tube because the subject pile height may be too high. It will be appreciated that, when the subject pile height is above the second beam 120, it may indicate that any one of the subject pile, the alignment pile, and/or the mounting pile 160 are installed at improper heights. The third beam 130 that may be output in the lower forward direction may represent a "go line." Thus, when the subject pile is above the third beam 130—and also below the second beam 120—the subject pile may be determined to be at an acceptable height to comply with the angular tolerance of a torque tube. When the subject pile is below the third beam 130, then the subject pile may be determined to be installed at an unacceptable height to comply with the angular tolerance of a torque tube because the subject pile height is too low. It will be appreciated that, when the subject pile height is below the third beam 130, it may indicate that any one of the subject pile, the alignment pile, and/or the mounting pile 160 are installed at improper heights. In some embodiments, the third beam 130 may have a different color than the second beam 120 in order for the two beams to be differentiated and to provide confirmation that the subject pile is in between the second beam 120 and the third beam 130. For example, the third beam 130, or the "go line" may be green while the second beam 120, or the "no-go line" may be red.

Modifications, additions, or omissions may be made to the instrument 100, as illustrated in FIG. 1B, without departing from the scope of the present disclosure. For example, in some embodiments, a single laser may be utilized and a beam from the single laser may be split into the first beam 110, the second beam 120, and/or the third beam 130 utilizing a beam splitting device. In these and other embodiments, the beam splitting device may be one or more prisms, one or more diffractive optical elements, beam-splitters in sequence, a multi-port beam splitter, one or more holographic lenses, or any other mechanism capable of splitting a beam.

In some embodiments, the instrument 100 may include two lasers in the laser assembly 103. A first laser 102 may project the first beam 110 in the backward direction and a beam (e.g., an input beam 105) from a second laser 102 may be split into the second beam 120 and the third beam 130 with a prism or another beam splitting device.

In some embodiments, the instrument 100 may include three lasers in the laser assembly 103. In these embodiments, a first laser 102 may project the first beam 110 in the backward direction, a second laser 102 may project the second beam 120 in the upper forward direction, and a third laser 102 may project the third beam 130 in a lower forward direction. In these embodiments, the instrument 100 may further include the body 101 connected to the mounting interface 104. The body 101 may house the first, second, and third lasers. The body 101 may further include a first bore which the first beam 110 may be projected through, a second bore which the second beam 120 may be projected through, and a third bore which the third beam 130 may be projected through.

In some embodiments, the laser(s) 102 included in the laser assembly 103 may be point lasers projecting the first beam 110, the second beam 120, and the third beam 130 as points of light. In some embodiments, the laser(s) 102 included in the laser assembly 103 may be a landscape laser projecting the first beam 110, the second beam 120, and the third beam 130 as planes of light.

In some embodiments, an optical device may be used in conjunction with or in replacement of the laser 102. In these embodiments, the optical device may be a sight glass, a scope with a reticle, or any other device capable of optically representing the angular tolerance of a torque tube. As an example, the laser assembly 103 and/or the laser 102 may be omitted and replaced with a scope, which may indicate a combined offset amount that is within an angular tolerance of a torque tube via lines present on the scope (e.g., an upper line may replace the second beam 120 and a lower line may replace the third beam 130). Continuing the example, when both the upper line and the lower line are present on the subject pile, then the height of the subject pile, the height of the alignment pile, or the height of the mounting pile 160 may be adjusted to ensure compliance with the angular tolerance of a torque tube. When neither the upper line nor the lower line are present on the subject pile, then the height of the subject pile, the height of the alignment pile, or the height of the mounting pile 160 may be adjusted to ensure compliance with the angular tolerance of a torque tube. When the lower line can be seen on the subject pile but the upper line cannot be seen, then the subject pile, the alignment pile, and the mounting pile 160 may be installed at an acceptable height to comply with the angular tolerance of a torque tube. In some embodiments, a mirror may be used in the optical device to allow alignment with the alignment pile. For example, there may be a center line on the scope, which may allow for alignment with the alignment pile via the mirror, and the upper line and the lower line may indicate the angular tolerance of the torque tube on the subject pile as described previously.

In some embodiments, the mounting interface 104 may allow the instrument 100 to be mounted on a torque tube after installation to determine whether the torque tube is within the angular tolerance. In these embodiments, the first beam 110 may be aligned with a target on a torque tube in an alignment direction, and it may be determined whether a target on a torque tube in a subject direction is within the second beam 120 and the third beam 130. In these and other embodiments, the mounting interface 104 may allow the laser to be mounted on a bearing housing coupled to the torque tube. In these embodiments, the first beam 110 may be aligned with a target on a bearing housing in an alignment direction, and it may be determined whether a target on a bearing housing in a subject direction is within the second beam 120 and the third beam 130. In these and other embodiments, the mounting interface 104 may allow the laser 102 to be mounted on the surface of a PV module after the PV module has been installed. In these embodiments, the first beam 110 may be aligned with a target on a PV module in an alignment direction, and it may be determined whether a target on a PV module in a subject direction is within the second beam 120 and the third beam 130.

In some embodiments, the mounting interface 104 may allow the laser 102 to be secured to any pile in a PV system. For example, the mounting interface 104 may allow the laser 102 to be mounted on the mounting pile 160, the alignment pile (not shown), and/or the subject pile (not shown). In these and other embodiments, the piles may be I-beams, H-Beams, W-Beams, S-Beams, Box Piles (hollow square tubes), cylindrical tubes, and/or any other pile utilized to provide vertical support to a torque tube. In embodiments where beam-type piles are utilized, the mounting interface 104 may allow the laser 102 to be secured to the web and/or flange of the beams. In embodiments where box piles and/or cylindrical tube piles are utilized, the mounting interface 104 may allow the laser 102 to be secured to any portion of the tube and/or any side of the box pile.

Although FIG. 1B is described as being used to determine whether the pile height of the subject pile is sufficient to comply with the angular tolerance of a torque tube, it will be appreciated that, in some embodiments, the instrument 100 may output the second beam 120, the third beam 130, and/or additional beams 140, in other directions to indicate the angular tolerance of a torque tube. For example, the instrument 100 may output a fourth beam in a fourth direction to indicate a left boundary of the angular tolerance of a torque tube and a fifth beam in a fifth direction to indicate a right boundary of the angular tolerance of a torque tube. Thus, the second beam 120 and the third beam 130 may be utilized to determine whether the pile height (e.g., the Y-direction) is compliant with the angular tolerance of the torque tube and the fourth beam and the fifth beam may be utilized to determine whether the pile alignment with the mounting pile in the left-right directions (e.g., the X-direction) is compliant with the angular tolerance of the torque tube.

Figure 1C:
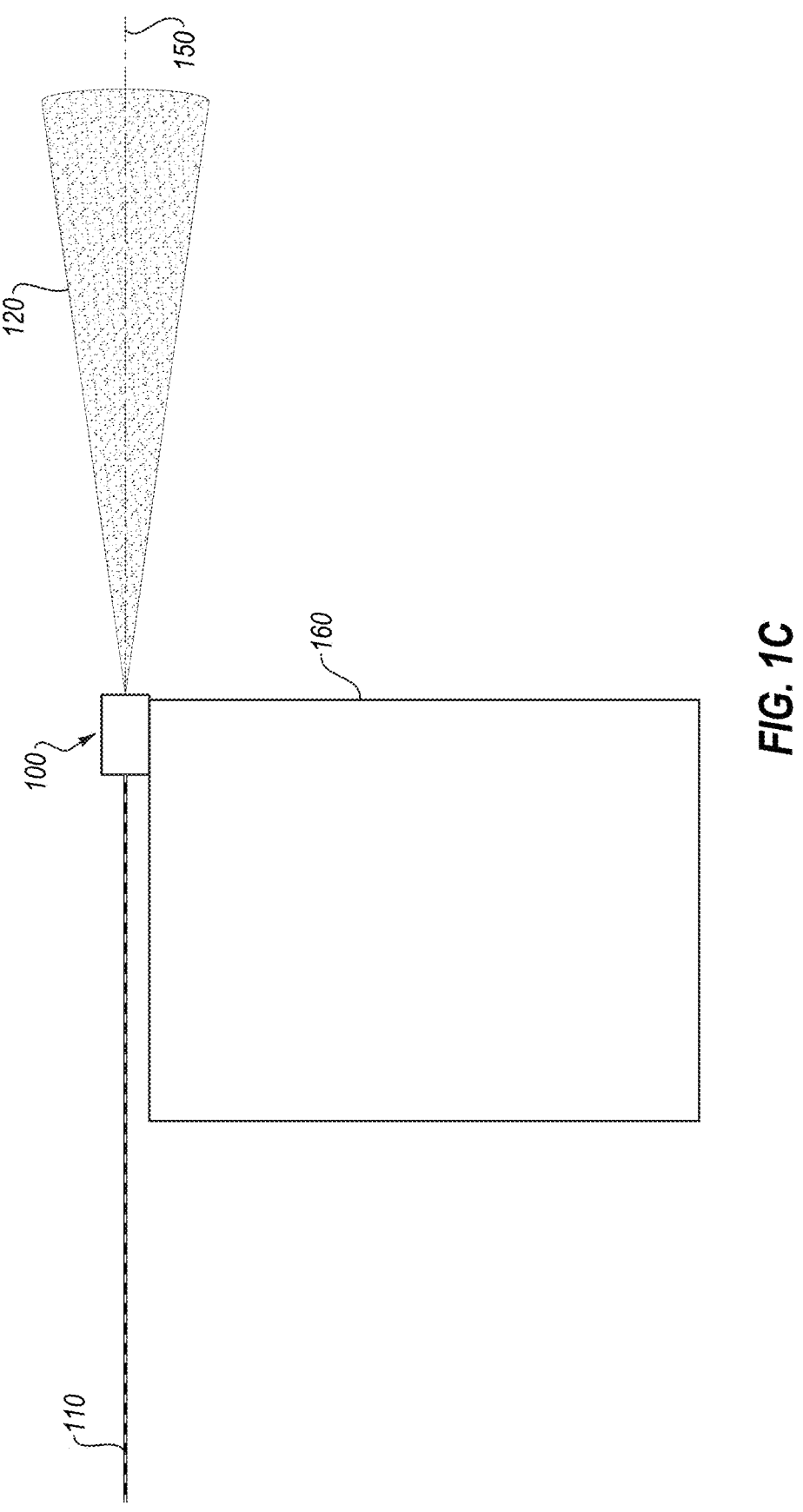
FIG. 1C illustrates the example instrument of FIG. 1A mounted to the mounting pile in which the example instrument outputs a first beam and a second beam.

FIG. 1C illustrates the example instrument 100 of FIG. 1A in which the instrument 100 outputs the first beam 110 and the second beam 120. Thus, FIG. 1C will be described in conjunction with FIG. 1A.

As illustrated in FIG. 1C, the example instrument 100 is mounted on the mounting pile 160 and outputs a first beam 110 in a backward direction towards an alignment pile (not shown), and outputs the second beam 120 as an area beam in a direction toward the subject pile. In some embodiments, the instrument 100 may output the first beam 110 and the second beam 120 through one or more lasers such as the one or more lasers 102 described with respect to FIG. 1A. For example, the lasers 102 may be any device capable of projecting focused light in the form of a beam such as a continuous-wave laser. In some embodiments, the first beam 110 and/or the second beam 120 may be output using one or more beam modification devices 106.

As described with respect to FIG. 1A, the instrument 100 may include a mounting interface 104 which may be configured to position the laser assembly 103 on the mounting pile 160 such that the first beam 110 may be output toward the alignment pile and the second beam 120 may be output toward the subject pile thereby allowing the second beam 120 to provide a visual confirmation of whether the subject pile is installed to comply with the angular tolerance of a torque tube. In some embodiments, the mounting interface 104 may position the laser assembly 103 on the mounting pile 160 such that the first beam 110 and the second beam 120 are output from a point that is substantially consistent with a height of the mounting pile 160.

As illustrated in FIG. 1C, the second beam 120 may be output by the instrument 100 as an area beam. In these and other embodiments, the cross-sectional area of the second beam 120 may indicate the angular tolerance of the torque tube. For example, the instrument 100 may be configured to output the second beam 120 such that the second beam 120 indicates whether the subject pile is within the angular tolerance in two-dimensions. For instance, the cross-sectional area of the second beam 120 may indicate whether the subject pile may be installed properly in the Y-direction (e.g., within acceptable vertical offsets) and in the X-direction (e.g., within acceptable horizontal (left-right) offsets).

In some embodiments, the second beam 120 may be conically shaped and have a circular cross-section as illustrated in FIG. 1C. In these and other embodiments, a lens 107 may be used to modify an input beam 105 of the instrument 100 to output the second beam 120 as an area beam. In these and other embodiments, the lens 107 may be an axicon lens that may convert an input beam 105 into second beam 120 such that the second beam 120 may indicate the angular tolerance of a torque tube.

In some embodiments, the cross-sectional area of the second beam 120 may be centered with the axis 150 or the center of the cross-sectional area of the second beam 120 may be offset from the axis 150. In some embodiments, the cross-sectional area of the second beam 120 may be greater above the axis 150 than below the axis 150. For example, the angular tolerance of the torque tube may be greater in an upward direction than in a downward direction. In some embodiments, the cross-sectional area of the second beam 120 may be greater below the axis 150 than above the axis 150. For example, the angular tolerance of the torque tube may be greater in a downward direction than in an upward direction. In some embodiments, the cross-sectional area of the second beam 120 may be greater in a first horizontal half (e.g., to the left of the axis 150) than in a second horizontal half (e.g., to the right of the axis 150) or vice versa. Thus, the second beam 120 may be configured to indicate different angular tolerances of the torque tube in different directions.

In some embodiments, a first boundary of the cross-sectional area of the second beam 120 may be offset from the axis 150 by a first fixed amount (e.g., +0° as illustrated in FIG. 1B), and a second boundary of the cross-sectional area of the second beam 120 may be offset from the axis 150 by a second fixed amount (e.g., −0° as illustrated in FIG. 1B). For example, the diameter of the circular cross sectional area of the second beam 120 illustrated in FIG. 1C may be defined by the sum of the first fixed amount and the second fixed amount. In some embodiments, the first fixed amount and the second fixed amount may be the same or the first and second fixed amounts may be different.

In some embodiments, the cross-sectional area of the second beam 120 may be symmetrically shaped or asymmetrically shaped. In some embodiments, the second beam 120 may be configured to indicate various angular tolerances of a torque tube (i.e. 1, 1.5, 2, 2.5 3, 3.5, 4, 4.5, 5, . . . n degrees depending on the angular tolerance of the torque tube). Additionally or alternatively, the second beam 120 may be selectively adjusted such that the second beam 120 may indicate other angular tolerances.

In an example operation, the first beam 110 may be aligned with the alignment pile. In some embodiments, the first beam 110 may be aligned with a point substantially consistent with the height of the alignment pile. The second beam 120 may be output toward a subject pile and the area of the second beam 120 may be considered a "go zone." Stated differently, the cross-sectional area of the second beam 120 may define the various potential subject pile installations that may comply with the angular tolerance of a torque tube. Thus, when the uppermost point of the subject pile is within the area defined by the second beam 120, the subject pile may be determined to be installed in a manner sufficient to comply with the angular tolerance of the torque tube.

In instances where the subject pile falls outside of the area defined by the second beam 120, it may be determined that that the subject pile does not comply with the angular tolerance of a torque tube. For example, the uppermost point subject pile may be positioned to the left, to the right, below, or above the cross-sectional area defined by the second beam 120. In these and other instances, the subject pile may be determined to be installed in a manner that is insufficient to comply with the angular tolerance of the torque tube. It will be appreciated that, when the subject pile height is installed outside of the area defined by the second beam 120, it may indicate that any one of the subject pile, the alignment pile, and/or the mounting pile 160 are installed at improper heights. Thus, in response, to the subject pile being determined not to comply with the angular tolerance of a torque tube, any or all of the subject pile, the alignment pile, and/or the mounting pile 160 may be adjusted such that the subject pile complies with the angular tolerance of the torque tube.

Modifications, additions, or omissions may be made to the instrument 100, as illustrated in FIG. 1C, without departing from the scope of the present disclosure. For example, in some embodiments, the second beam 120 may be a point beam rather than an area beam as illustrated in FIG. 1B. In these and other embodiments, the instrument 100 may include a beam splitting device such as the beam splitting devices 108 described with respect to FIG. 1A.

In some embodiments, the area defined by the second beam 120 may be differently shaped than as shown in FIG. 1C. For example, the beam may have a differently shaped cross-sectional area other than a circular area. Furthermore, in some embodiments, the second beam 120 may be a output by a landscape laser such that the second beam 120 is output as a plane of light.

Figure 2A:
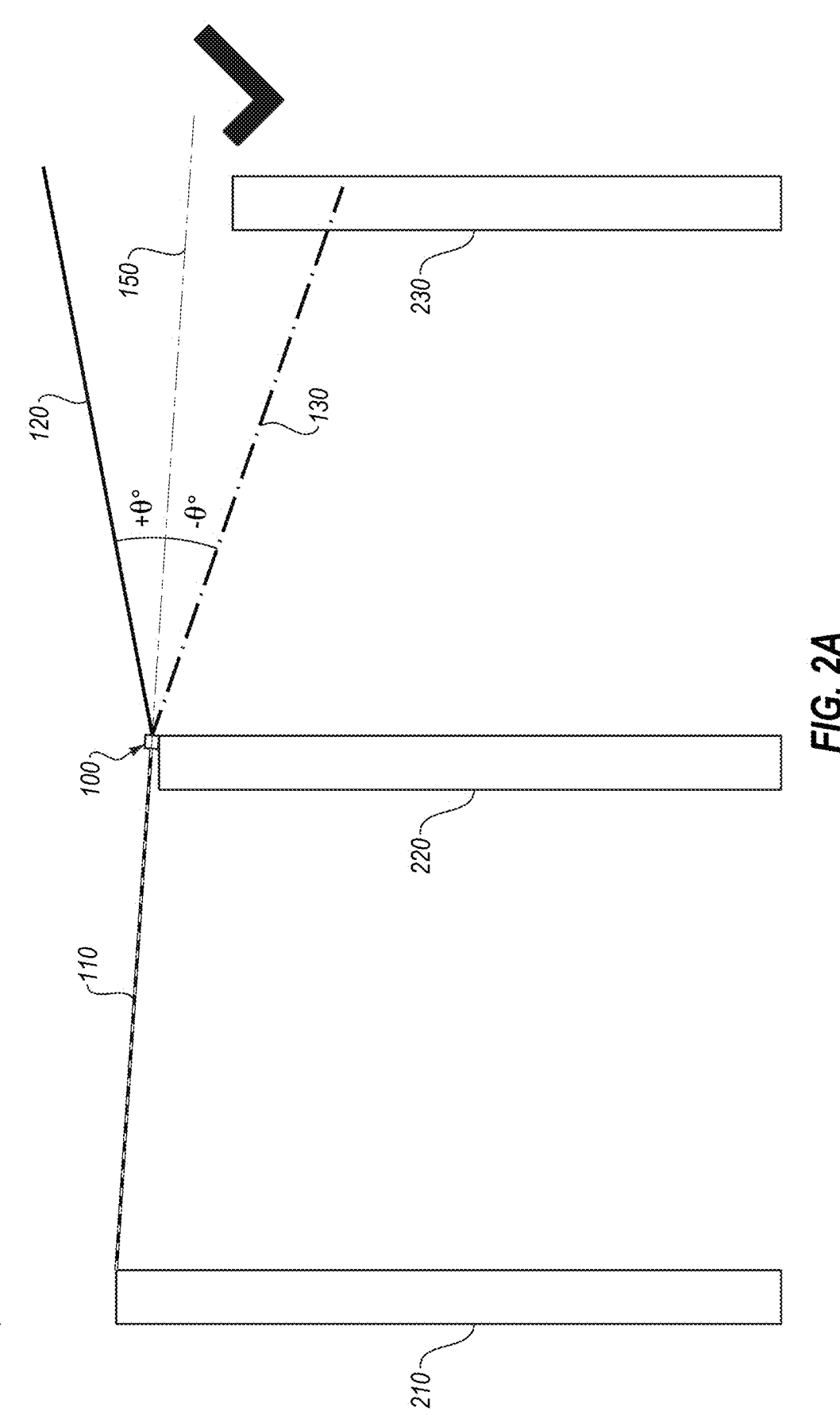
FIGS. 2A-2C illustrate example systems for ensuring proper pile installation in PV systems in which a second beam and a third beam indicate the angular tolerance of a torque tube.

FIG. 2A illustrates an example system 200a for ensuring proper pile installation in photovoltaic systems. The example system 200a includes the instrument 100 (as illustrated in FIG. 1B) which outputs the first beam 110 in a backward direction towards an alignment pile 210, the second beam 120 in an upper forward direction towards a subject pile 230, and the third beam 130 in a lower forward direction towards the subject pile 230. The instrument 100 may be coupled to a mounting pile 220 via, for example, the mounting interface 104. The instrument 100, the first beam 110, the second beam 120, the third beam 130, and the mounting interface 104 are all as described with reference to FIG. 1A and FIG. 1B.

The alignment pile 210, the mounting pile 220, and the subject pile 230 may anchor and/or support a PV system and may be similar to similarly named piles described throughout the present disclosure. Although FIG. 2A is described with reference to a PV system utilizing torque tubes like a solar tracking system, it is appreciated that the instrument 100 may be used in any PV system to confirm proper pile installation based on any angular metric.

Figure 2B:
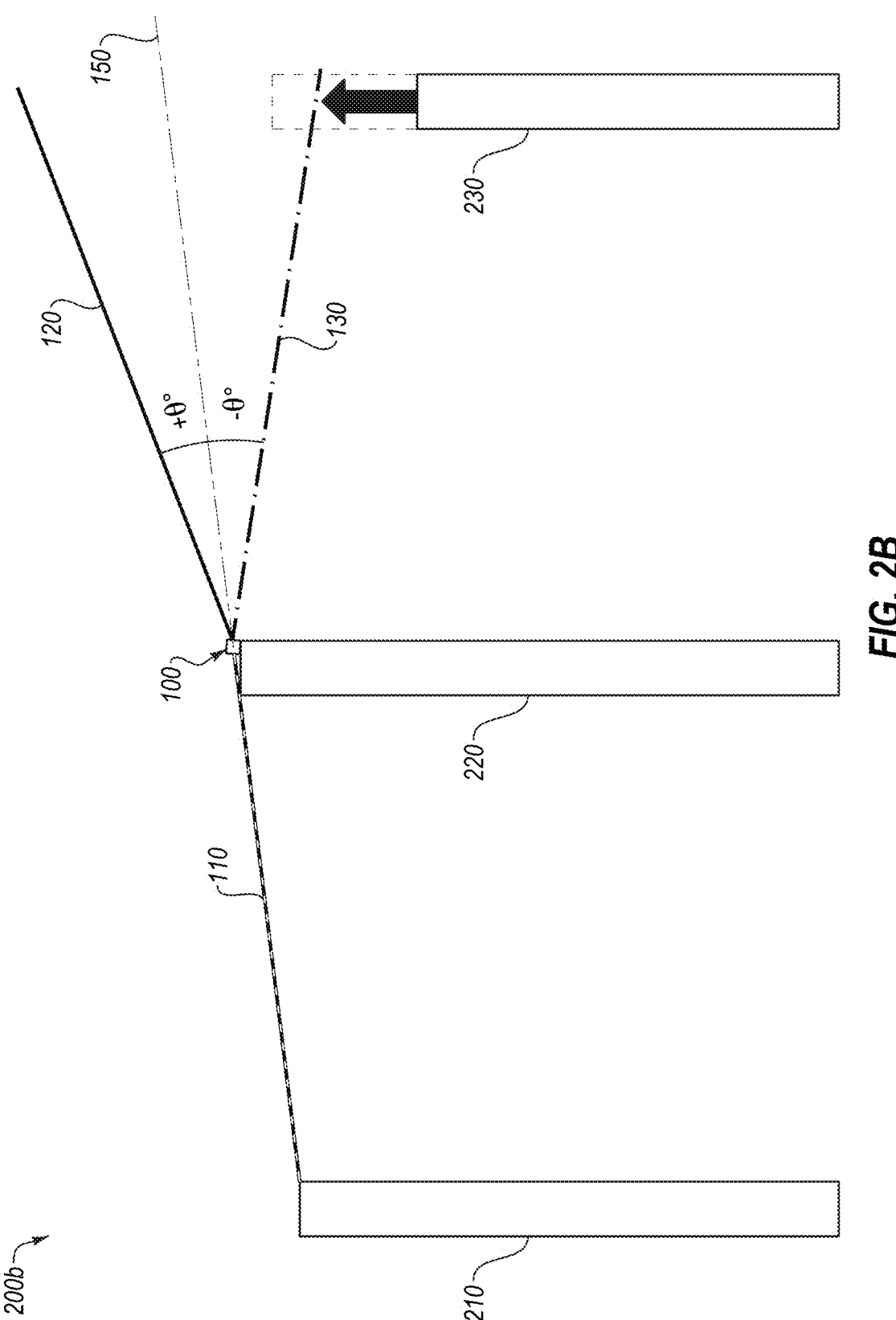
Figure 2C:
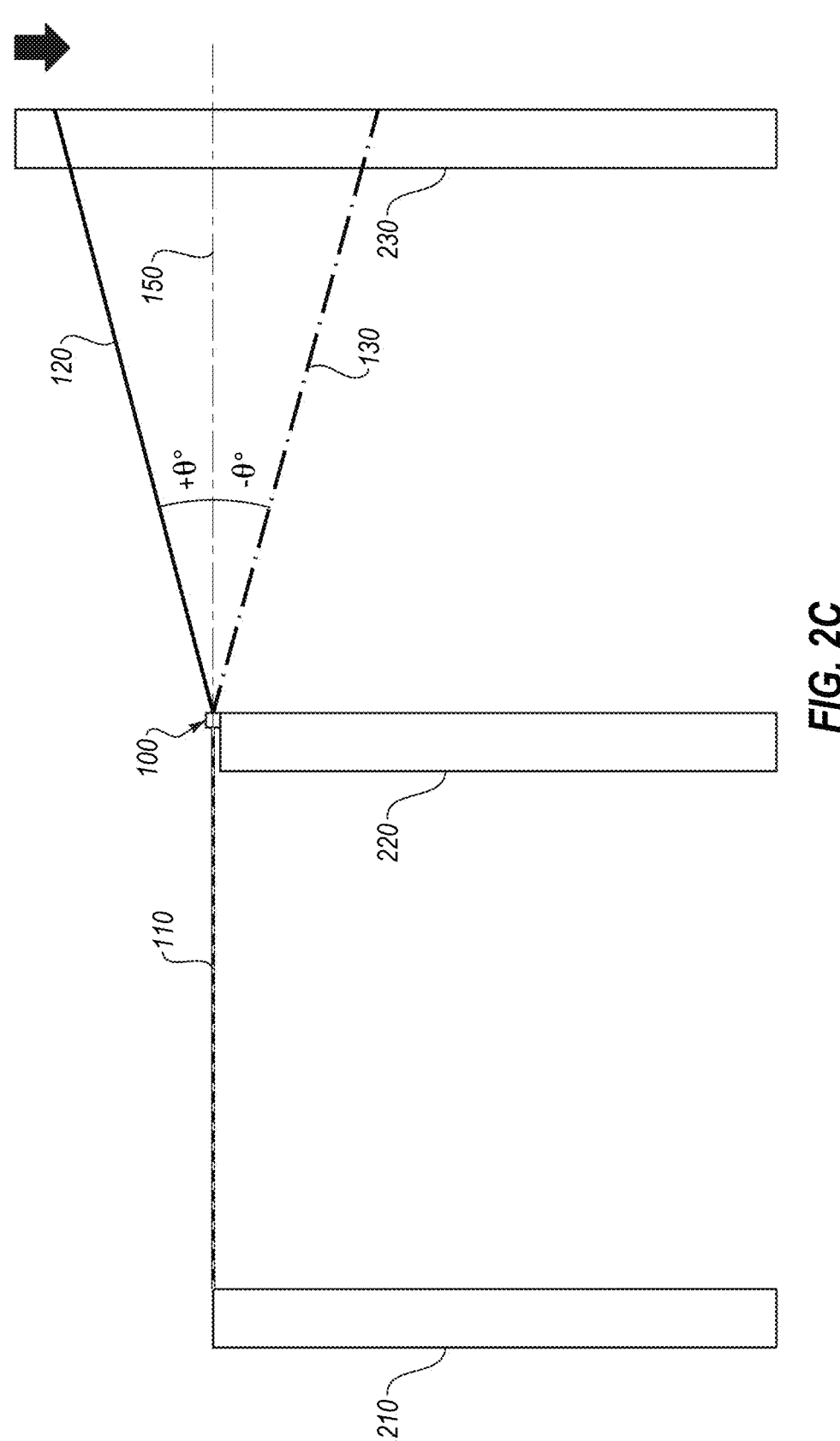

The first beam 110 may be aligned with a point on the alignment pile 210. In some embodiments, the first beam 110 may be aligned with a point substantially consistent with the height of the alignment pile 210. In these and other embodiments, the instrument 100 may be positioned on the mounting pile 220 at a height substantially consistent with the height of the mounting pile 220. In some embodiments, the alignment pile 210 may be installed at a height greater than that of the mounting pile 220 (as shown in FIG. 2A). In some embodiments, the alignment pile 210 may be installed a height lesser than that of the mounting pile 220 (as shown in FIG. 2B). In some embodiments, the alignment pile 210 may be installed at a height substantially the same as the height of the mounting pile 220 (as shown in FIG. 2C).

In some embodiments, a sensor (not illustrated) may be placed on the alignment pile 210, which may provide an indication that the first beam 110 is properly positioned on the alignment pile 210. For example, when the first beam 110 is aligned with the alignment pile 210, the sensor may indicate alignment with a visual indication (i.e. a light flashing green) and/or an audible indication (i.e. an audible sound). In some embodiments, the sensor may indicate that the first beam 110 is not aligned with the alignment pile 210. For example, the sensor may provide a visual indication (i.e. a light flashing red) and/or an audible indication (i.e. an audible sound) that the first beam 110 is not aligned with the alignment pile 210. In some embodiments, a second sensor performing a similar function may be placed on the mounting pile 220.

As shown in FIG. 2A, the subject pile 230 may be installed at a height where the subject pile 230 is below the second beam 120 and above the third beam 130. In these embodiments, the second beam 120 may not strike the subject pile 230 and the third beam 130 may strike the subject pile 230, which may provide an indication that the subject pile 230 is installed at an acceptable height to comply with the angular tolerance of a torque tube. Thus, based on the indication, the subject pile 230 may be deemed to comply with the angular tolerance of a torque tube.

In some embodiments, one or more sensors may be placed on the subject pile 230, which may indicate that the subject pile height is between the second beam 120 and the third beam 130, and thus, that the height is acceptable to comply with the angular tolerance of a torque tube. For example, if the height of the subject pile 230 is between the second beam 120 and the third beam 130, the sensor may provide a visual indication (i.e. an LED flashing green) and/or an audible indication (i.e. a beeping sound) that the height of the subject pile 230 is acceptable to comply with the angular tolerance of a torque tube.

In some embodiments, the sensor may indicate that the subject pile 230 is not at an acceptable height to comply with the angular tolerance of a torque tube. For example, the sensor may provide a visual indication (i.e. an LED flashing red) and/or an audible indication (i.e. a beeping sound) that the height of the subject pile 230 is above the second beam 120 and/or that the height of the subject pile 230 is below the third beam 130. In these and other embodiments, the sensor or a second sensor performing a similar function may be placed on the mounting pile 220. In these and other embodiments, the sensor may indicate that the first beam 110 is aligned with the alignment pile 210 and that the subject pile 230 is at a height acceptable to comply with the angular tolerance of a torque tube. For example, the sensor may be placed on the mounting pile 220 and there may be a visual indicator on an alignment side of the sensor, which may indicate whether the first beam 110 is aligned with the alignment pile 210. Additionally, there may be a visual indicator on a subject side of the sensor, which may indicate whether the subject pile 230 is at an acceptable height to comply with the angular tolerance of a torque tube.

FIG. 2B illustrates an example system 200b for ensuring proper pile heights in PV systems. The example system 200b includes similar components to that of FIG. 2A and that function similarly to those components in FIG. 2A.

However, as shown in the example system 200b of FIG. 2B, the subject pile 230 may be installed at a height where the subject pile 230 is below the second beam 120 and below the third beam 130. In these embodiments, the second beam 120 and the third beam 130 may not strike the subject pile 230 providing an indication that the subject pile 230 is not installed at an acceptable height to comply with the angular tolerance of a torque tube because the height of the subject pile 230 is too low. Thus, based on the indication, the subject pile 230 may be adjusted to increase the height of the subject pile 230 such that the subject pile 230 is in compliance with the angular tolerance for a torque tube. Additionally or alternatively, the height of the mounting pile 220 and/or the height of the alignment pile 210 may be adjusted such that the subject pile 230 is in compliance with the angular tolerance for a torque tube.

FIG. 2C illustrates an example system 200c for ensuring proper pile heights in photovoltaic systems. The example system 200c includes similar components to that of FIG. 2A and that function similarly to those components in FIG. 2A.

As illustrated in the example system 200c of FIG. 2C, the subject pile 230 may be installed at a height where the subject pile 230 is above the second beam 120 and the third beam 130. In these embodiments, the second beam 120 and the third beam 130 may both strike the subject pile 230, which may provide an indication that the subject pile 230 is not installed at an acceptable height to comply with the angular tolerance of a torque tube because the height of the subject pile 230 is too high. Thus, based on the indication, the subject pile 230 may be adjusted to decrease the height of the subject pile 230 such that the height of the subject pile 230 is in between the second beam 120 and the third beam 130 ensuring that the subject pile 230 is installed at an acceptable height to comply with the angular tolerance for a torque tube. Additionally or alternatively, the height of the mounting pile 220 and/or the height of the alignment pile 210 may be adjusted such that the subject pile 230 is in compliance with the angular tolerance for a torque tube.

Modifications, additions, or omissions may be made to the example systems 200a-200c without departing from the scope of the present disclosure. For example, while the instrument 100 depicted in the example systems 200a-200c is illustrated as outputting a first beam 110, a second beam 120, and a third beam 130 as described with respect to FIG. 1B, it will be appreciate that the instrument 100 may be modified as indicated throughout the disclosure to verify whether the subject pile 230 is installed in a manner sufficient to comply with the angular tolerance of a torque tube.

Figure 3A:
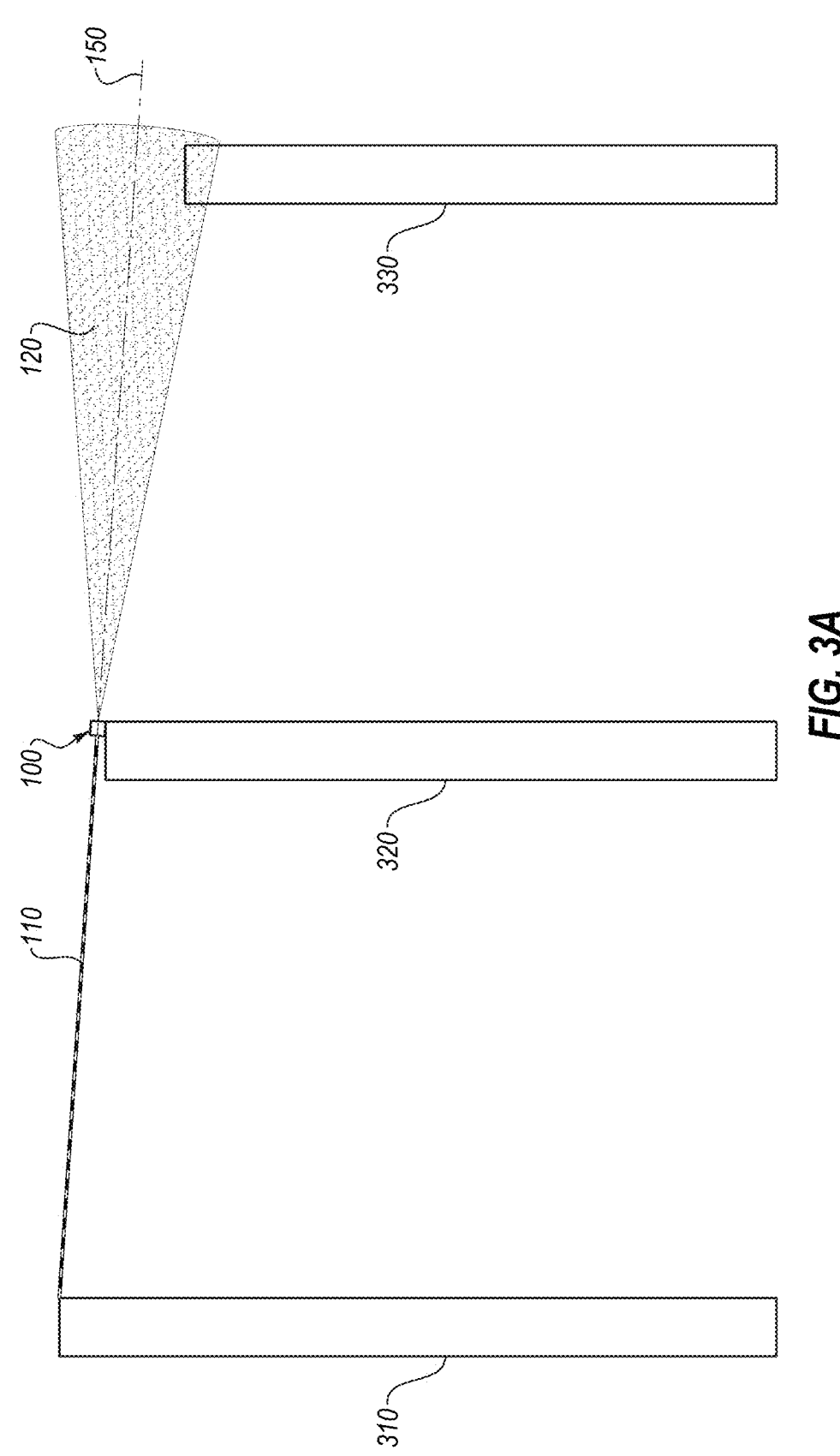
FIGS. 3A-3F illustrate example systems for ensuring proper pile installation in PV systems in which the second beam is output as an area beam.

FIG. 3A illustrates an example system 300*a* for ensuring proper pile installation in photovoltaic systems. The example system 300*a* includes the instrument 100 (as illustrated in FIG. 1C) which outputs the first beam 110 in a backward direction towards an alignment pile 310 and outputs the second beam 120 as an area beam toward towards a subject pile 330. The instrument 100 may be coupled to a mounting pile 320 via, for example, the mounting interface 104. The instrument 100, the first beam 110, the second beam 120, the third beam 130, and the mounting interface 104 are all as described with reference to FIG. 1A and FIG. 1C.

The alignment pile 310, the mounting pile 320, and the subject pile 330 may anchor and/or support a PV system and may be similar to similarly named piles described throughout the present disclosure. Although FIG. 3A is described with reference to a PV system utilizing torque tubes like a solar tracking system, it is appreciated that the instrument 100 may be used in any PV system to confirm pile installation based on any angular metric.

The first beam 110 may be aligned with a point on the alignment pile 310. In some embodiments, the first beam 110 may be aligned with a point substantially consistent with the height of the alignment pile 310. In these and other embodiments, the instrument 100 may be positioned on the mounting pile 320 at a height substantially consistent with the height of the mounting pile 320. In some embodiments, the alignment pile 310 may be vertically offset from the mounting pile 320 (e.g., at a height greater than that of the mounting pile 320 or at a height lesser than that of the mounting pile 320) and/or horizontally offset from the mounting pile 320 (e.g., left or right of relative to the mounting pile 320). In some embodiments, the alignment pile 310 may be substantially aligned with the mounting pile 320.

In some embodiments, a sensor (not illustrated) may be placed on the alignment pile 310, which may provide an indication that the first beam 110 is properly positioned on the alignment pile 310 in a similar manner as is described in more detail with reference to FIG. 2A. In some embodiments, a second sensor performing a similar function may be placed on the mounting pile 320.

Figure 3B:
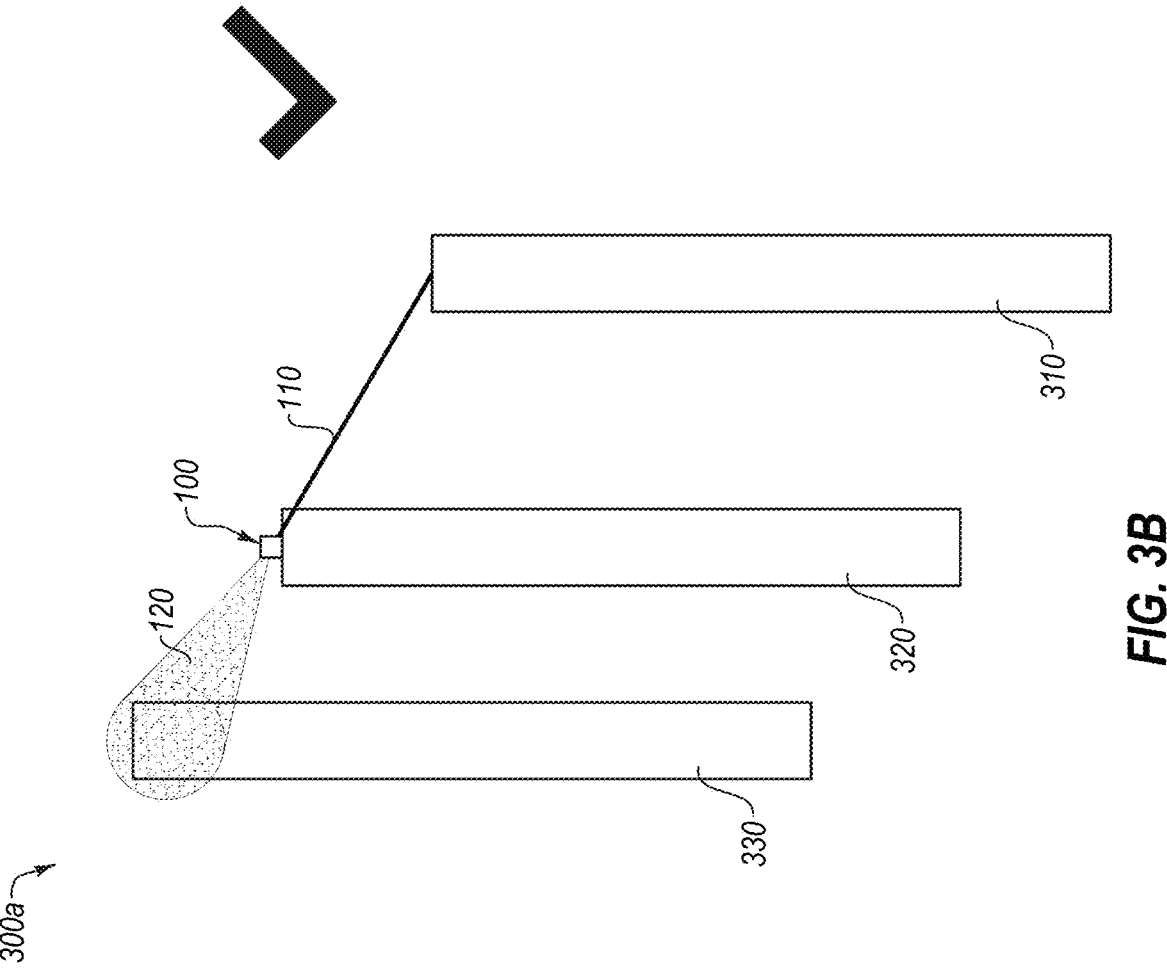

FIG. 3B illustrates a perspective view of the example system 300*a*. As shown in FIG. 3B, the subject pile 330 may be installed such that the subject pile 330 is positioned within the cross-sectional area of the second beam 120. For example, as illustrated in FIG. 3B, an uppermost portion of the subject pile 330 may be positioned within the circular cross-section of the second beam 120. In these embodiments, the subject pile 330 being positioned within the area of the second beam 120 may provide an indication that the subject pile 330 is installed in compliance with the angular tolerance of a torque tube. Thus, based on the indication, the subject pile 330 may be deemed to comply with the angular tolerance of a torque tube.

In some embodiments, one or more sensors may be placed on the subject pile 330, which may indicate that the subject pile 330 is positioned within the second beam 120, and thus, that the subject pile 330 is acceptable to comply with the angular tolerance of a torque tube. The sensors that may be placed on the subject pile 330 are described in more detail with reference to FIG. 2A.

Figure 3C:
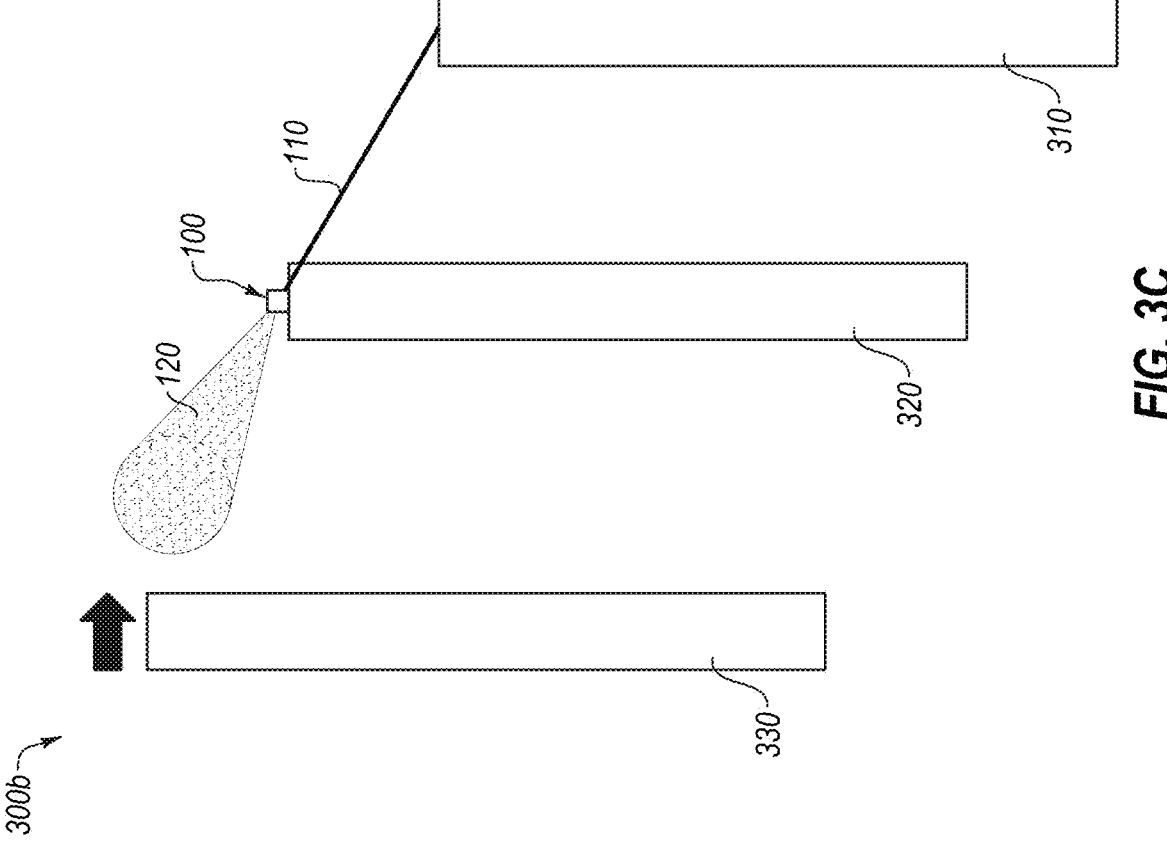

FIG. 3C illustrates an example system 300*b* for ensuring proper pile installation in PV systems. The example system

300*b* includes similar components to that of FIGS. 3A and 3B and that may function similarly to those illustrated in FIGS. 3A and 3B.

However, as shown in the example system 300*b* of FIG. 3C, the subject pile 330 may be horizontally offset from the mounting pile 320 such that the subject pile 330 is positioned to the left of the second beam 120 (when viewed from the mounting pile 320). In these and other embodiments, the second beam 120 may not strike the subject pile 330 providing an indication that the subject pile 330 is not installed in compliance with the angular tolerance of a torque tube because the subject pile 330 is offset too far to the left of the mounting pile 320. Thus, based on the indication, the subject pile 330 may be adjusted to the right such that subject pile 330 may be positioned within the area defined by the second beam 120 thereby allowing the subject pile 330 to be in compliance with the angular tolerance for a torque tube. Additionally or alternatively, the mounting pile 320 and/or the alignment pile 310 may be adjusted such that the subject pile 330 is in compliance with the angular tolerance for a torque tube.

Figure 3D:
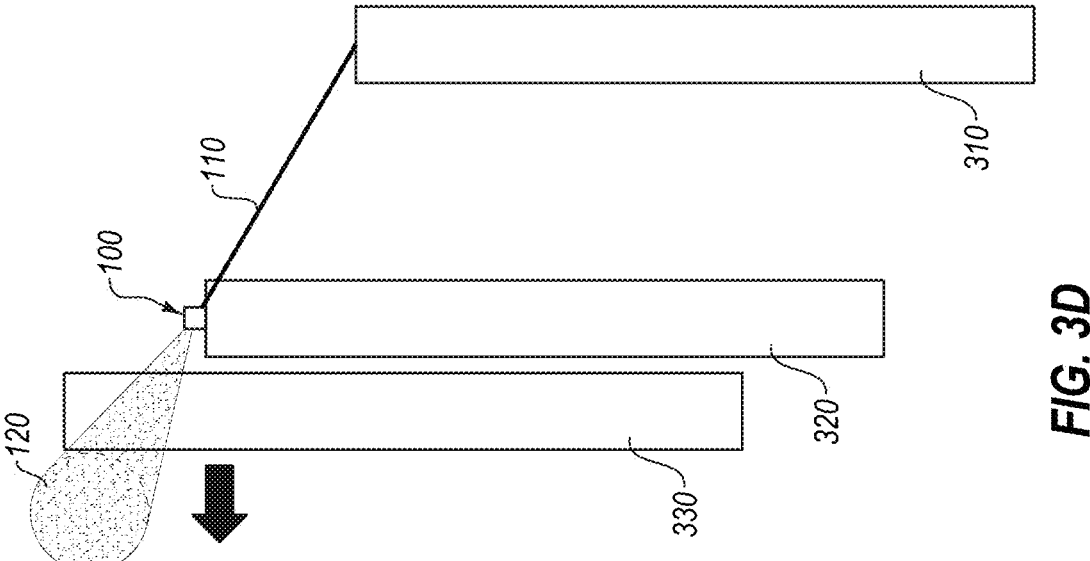
Figure 3D:

FIG. 3D illustrates an example system 300*c* for ensuring proper pile installation in PV systems. The example system 300*c* includes similar components to that of FIGS. 3A and 3B and that may function similarly to those illustrated in FIGS. 3A and 3B.

However, as shown in the example system 300*c* of FIG. 3D, the subject pile 330 may be horizontally offset from the mounting pile 320 such that the subject pile 330 is positioned to the right of the second beam 120 (when viewed from the mounting pile 320). In these and other embodiments, the second beam 120 may not strike the subject pile 330 providing an indication that the subject pile 330 is not installed in compliance with the angular tolerance of a torque tube because the subject pile 330 is offset too far to the right of the mounting pile 320. Thus, based on the indication, the subject pile 330 may be adjusted to the left such that subject pile 330 may be positioned within the area defined by the second beam 120 thereby allowing the subject pile 330 to be in compliance with the angular tolerance for a torque tube. Additionally or alternatively, the mounting pile 320 and/or the alignment pile 310 may be adjusted such that the subject pile 330 is in compliance with the angular tolerance for a torque tube.

Figure 3E:
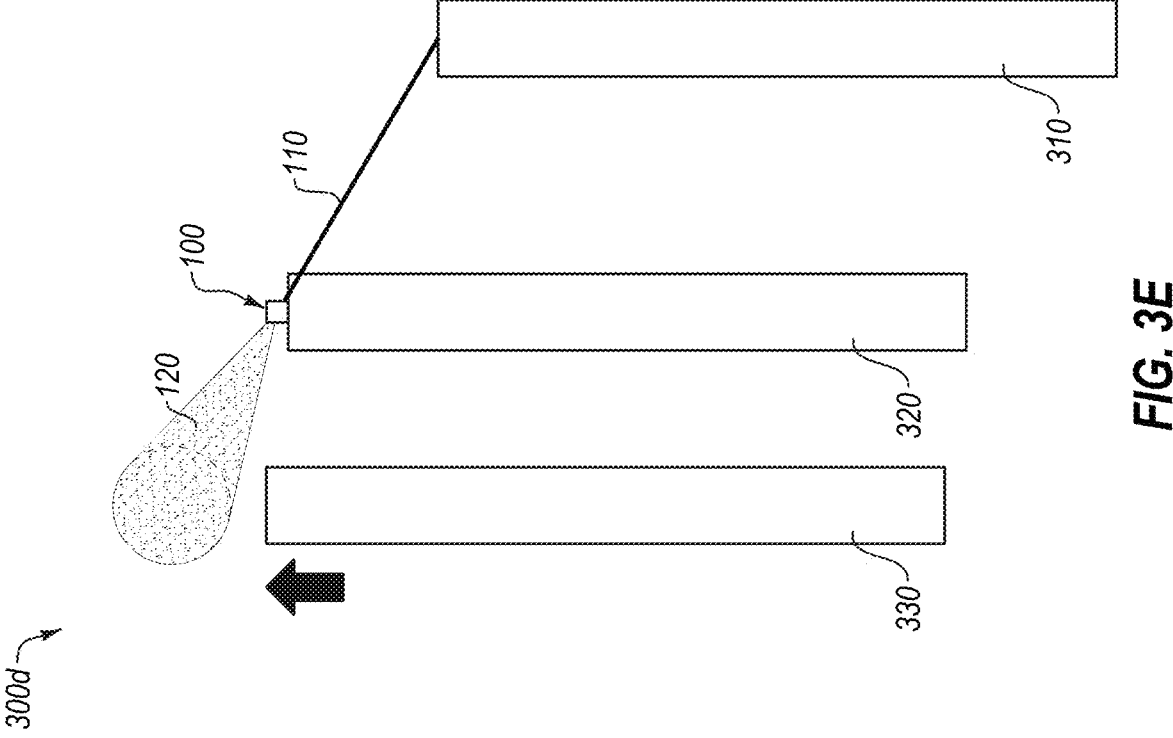

FIG. 3E illustrates an example system 300*d* for ensuring proper pile installation in PV systems. The example system 300*d* includes similar components to that of FIGS. 3A and 3B and that may function similarly to those illustrated in FIGS. 3A and 3B.

However, as shown in the example system 300*d* of FIG. 3E, the subject pile 330 may be vertically offset from the mounting pile 320 such that the subject pile 330 is positioned below the second beam 120. For example, an uppermost portion of the subject pile 330 may be positioned below the second beam 120. In these and other embodiments, the second beam 120 may not strike the subject pile 330 providing an indication that the subject pile 330 is not installed in compliance with the angular tolerance of a torque tube because the subject pile 330 is offset too far below the mounting pile 320. Thus, based on the indication, the subject pile 330 may be upwardly adjusted such that subject pile 330 may be positioned within the area defined by the second beam 120 thereby allowing the subject pile 330 to be in compliance with the angular tolerance for a torque tube. Additionally or alternatively, the mounting pile 320 and/or the alignment pile 310 may be adjusted such that the subject pile 330 is in compliance with the angular tolerance for a torque tube.

Figure 3F:
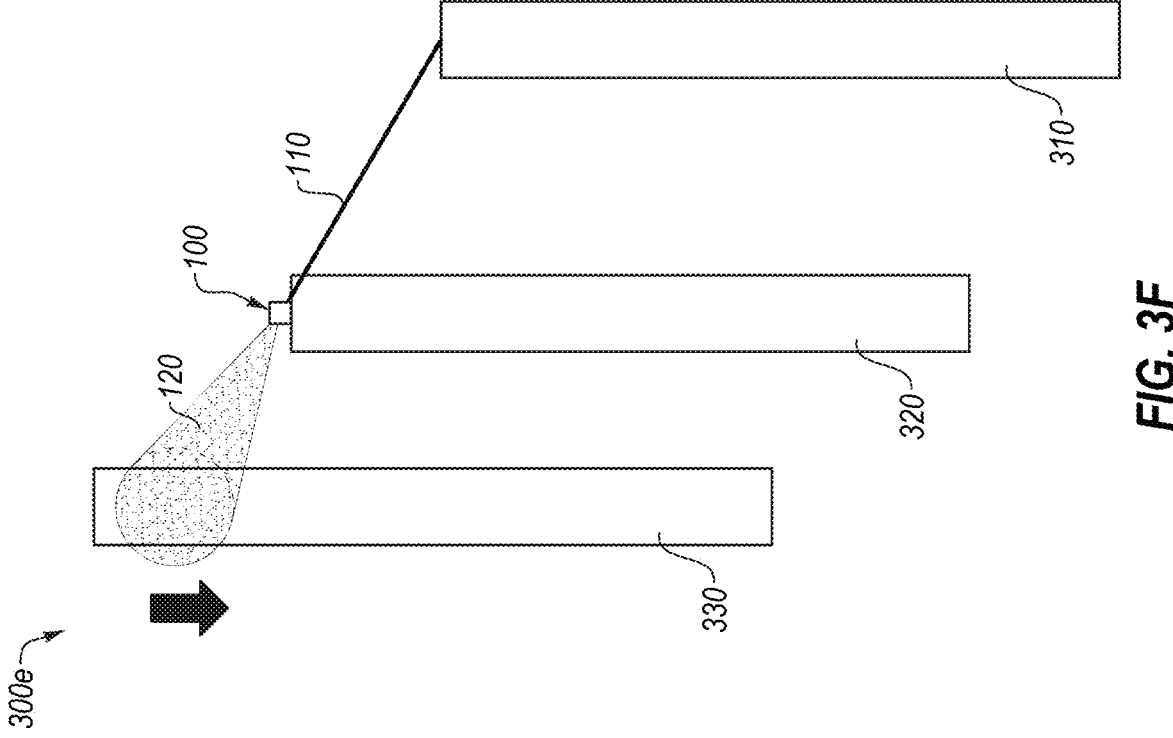

FIG. 3F illustrates an example system 300e for ensuring proper pile installation in PV systems. The example system 300e includes similar components to that of FIGS. 3A and 3B and that may function similarly to those illustrated in FIGS. 3A and 3B.

However, as shown in the example system 300e of FIG. 3F, the subject pile 330 may be vertically offset from the mounting pile 320 such that the subject pile 330 is positioned above the second beam 120. For example, an uppermost portion of the subject pile 330 may be positioned above the second beam 120. In these and other embodiments, the second beam 120 may strike the subject pile 330 but the uppermost portion of the subject pile 330 may be positioned above the second beam 120, which may indicate that the subject pile 330 is not installed in compliance with the angular tolerance of a torque tube because the subject pile 330 is offset too far below the mounting pile 320. Thus, based on the indication, the subject pile 330 may be downwardly adjusted such that subject pile 330 may be positioned within the area defined by the second beam 120 thereby allowing the subject pile 330 to be in compliance with the angular tolerance for a torque tube. Additionally or alternatively, the mounting pile 320 and/or the alignment pile 310 may be adjusted such that the subject pile 330 is in compliance with the angular tolerance for a torque tube.

Modifications, additions, or omissions may be made to the example systems 300a-300e without departing from the scope of the present disclosure. For example, while the instrument 100 depicted in the example systems 300a-300e is illustrated as projecting a first beam 110 and a second beam 120 as described with respect to FIG. 1C, it will be appreciate that the instrument 100 may be modified as indicated throughout the disclosure to verify whether the subject pile 330 is installed in a manner sufficient to comply with the angular tolerance of a torque tube.

Figures 4A, 4B, 4C:
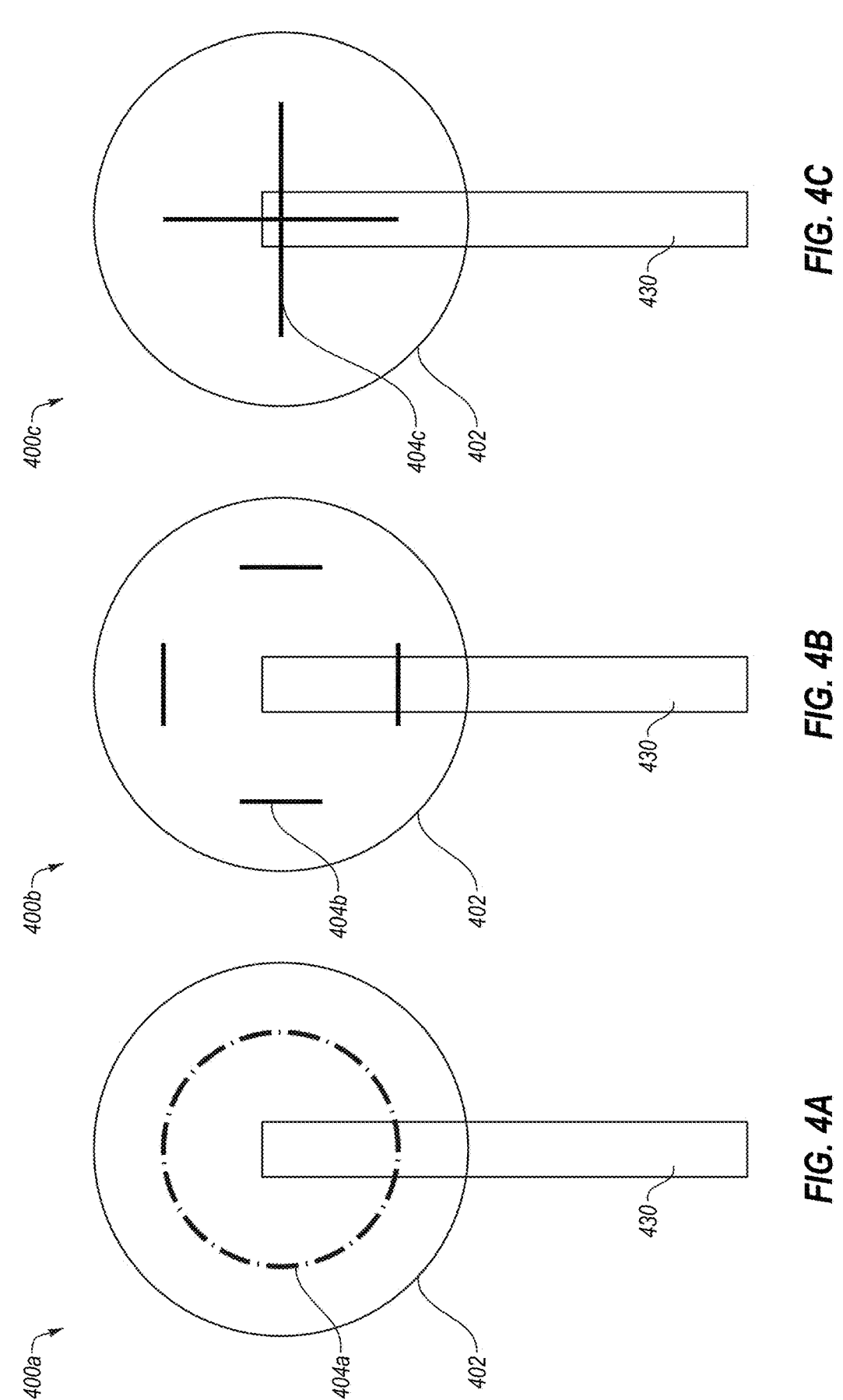
FIGS. 4A-4C illustrate example systems for ensuring proper pile installation in PV systems via a scope.

FIGS. 4A-4C illustrate example systems 400a-400c for ensuring proper pile installation in PV systems via a scope 402. FIGS. 4A-4C illustrate a subject pile 430 viewed through the scope 402 that may be used to determine whether the subject pile 430 is installed to comply with the angular tolerances of a torque tube. For example, the scope 402 may be included in an instrument such as the instrument 100 described with respect to FIG. 1A or another instrument. For instance, the scope 402 may be used in conjunction with or instead of the laser assembly 103 described with respect to FIG. 1A.

In some embodiments, the scope 402 may provide a reticle 404 that may indicate the angular tolerance of the torque tube. In some embodiments, the reticle 404 may be configured to provide visual boundaries that may correspond to the acceptable angular tolerance range for torque tube installation. In some embodiments, the scope 402 may be used in conjunction with an alignment mechanism (e.g., such as the first beam 110), which may ensure that the reticle 404 is accurately positioned to indicate the angular tolerance of a torque tube. In these and other embodiments, the reticle 404 may be used to determine whether the subject pile 430 is installed in compliance with the angular tolerance of a torque tube.

In some embodiments, the reticle 404 may have varying shapes and/or configurations to indicate the angular tolerance of the torque tube. In some embodiments, the reticle 404 may indicate the outer boundary of the angular tolerance of the torque tube. For example, as illustrated in FIG. 4A, the reticle 404a may define the outer boundary of the angular tolerance of the torque tube. For instance, where the subject pile 430 is positioned within the reticle 404a, the subject pile 430 may be deemed to be installed in compliance with the angular tolerance of a torque tube, and where the subject pile 430 is positioned outside of the reticle 404a, the subject pile 430 may be deemed not to be installed in compliance with the angular tolerance of a torque tube. In these and other embodiments, the subject pile 430 may be determined to be installed in compliance with the angular tolerance of a torque tube when an uppermost portion of the subject pile is positioned within the boundaries of the reticle 404a.

In some embodiments, the reticle 404 may include multiple boundaries that correspond to various angular tolerances of a torque tube. For example, the reticle 404a may include an additional circular reticle that may indicate an additional angular tolerance of a torque tube. For instance, the reticle 404a may include multiple concentric circles that each may each indicate a different angular tolerance of a torque tube (e.g., 1 degree, 2 degrees, and 3 degrees).

In some embodiments, the reticle 404 may indicate multiple boundaries that correspond to a single angular tolerance of a torque tube. For example, as illustrated in FIG. 4B, the reticle 404b may define an upper boundary, a lower boundary, a left boundary, and/or a right boundary that may indicate the angular tolerance of a torque tube. For instance, where the subject pile 430 is positioned within the upper, lower, left, and right boundaries provided by the reticle 404b, the subject pile 430 may be deemed to be installed in compliance with the angular tolerance of a torque tube. In these and other embodiments, the subject pile 430 may be determined to be installed in compliance with the angular tolerance of a torque tube when an uppermost portion of the subject pile is positioned within the multiple boundaries of the reticle 404b.

In some embodiments, the reticle 404 striking the subject pile 430 may indicate that the subject pile is installed within the angular tolerance of a torque tube. For example, as illustrated in FIG. 4C, the reticle 404c may include crosshairs that may indicate that the subject pile is installed within the angular tolerance of the torque tube when the subject pile 430 is positioned in alignment with the crosshairs. In these and other embodiments, the subject pile 430 may be determined to be installed in compliance with the angular tolerance of a torque tube when an uppermost portion of the subject pile is aligned within the crosshairs of the reticle 404c. In some embodiments, the crosshairs may define quadrants as shown in FIG. 4C, and the subject pile 430 may be determined to be installed in compliance with the angular tolerance of the torque tube when the subject pile 430 is positioned within the quadrants defined by the crosshairs of the reticle 404c.

In some embodiments, the scope 402 may be included in a beam modification device such as the beam modification devices 106 described with respect to FIG. 1A. For example, the laser assembly 103 may be configured to output the second beam 120 as the reticle 404 via the scope 402.

In some embodiments, the scope 402 may be used without laser beams by utilizing an etched reticle pattern, an electronically produced reticle pattern, and/or an illuminated reticle pattern, among other reticles 404 that may be produced without laser beams. For example, an etched reticle may be permanently marked on optical elements within the scope 402.

In some embodiments, the scope 402 may include magnification optics that may enhance the visibility of the subject pile 430. In these and other embodiments, the magnification optics may be configured to provide a visual confirmation of whether the subject pile 430 is positioned within the reticle 404.

In some embodiments, the scope 402 may indicate acceptable versus unacceptable tolerance ranges through different visual indicators within the reticle markings. In some embodiments, acceptable ranges may be indicated by specific colors, patterns, or markings within the reticle 404. In some embodiments, the scope 402 and/or the reticle 404 may be adjustable to correspond to different torque tube angular tolerances.

Modifications, additions, or omissions may be made to the example systems 400a-400c without departing from the scope of the present disclosure. For example, the reticles 404a-404c indicate example shapes and/or configurations of the reticle 404, and it will be appreciated that one skilled in the art may modify the scope 402 to depict other reticles 404 which may indicate whether the subject pile 430 is installed in compliance with the angular tolerance of a torque tube.

FIG. 5 illustrates a flowchart of an example method 500 of ensuring proper pile installation in PV systems, in accordance with one or more embodiments of the present disclosure. The method 500 may be performed by any suitable system or device. For example, the method 500 may be implemented using the instrument 100 of FIG. 1A, 1B, or 1C and/or any of the example systems 200a-200c, 300a-300e, and/or 400a-400c. Although illustrated with discrete blocks, the steps and operations associated with one or more blocks of the method 500 may be divided into additional blocks, combined into fewer blocks, or eliminated, depending on the particular implementation.

At block 502, an instrument may be positioned on a surface of a mounting pile, and the instrument may include a laser assembly that outputs a first beam in a first direction and a second beam in a second direction. In these and other embodiments, the second beam may indicate an angular tolerance of a torque tube. The instrument of block 502 may be similar to and perform similar functions to the instruments described throughout this disclosure. The mounting pile may be similar to the mounting piles described throughout this disclosure. In some embodiments, the instrument may be positioned on the surface of the mounting pile at a height substantially consistent with the height of the mounting pile.

At block 504, the first beam may be aligned with a point on an alignment pile. The alignment pile may be similar to the alignment piles described throughout the present disclosure. In some embodiments, the first beam may be aligned with a point substantially consistent with the height or near the top of the alignment pile.

At block 506, the second beam may be used as a reference to determine whether a subject pile is in compliance with the angular tolerance of the torque tube. The subject pile may be similar to the subject piles described throughout the present disclosure. In these and other embodiments, in response to the subject pile being determined not to be in compliance with the angular tolerance of the torque tube, one or more of the mounting pile, the alignment pile, and/or the subject pile may be adjusted.

In some embodiments, the laser assembly may output a third beam in a third direction, and the second direction and third direction may be offset from parallel with the first direction by a combined offset amount that indicates the angular tolerance of the torque tube.

Modifications, additions, or omissions may be made to the method 500 without departing from the scope of the disclosure. For example, the designations of different elements in the manner described is meant to help explain concepts described herein and is not limiting. Further, the method 500 may include any number of other elements or may be implemented within other systems or contexts than those described.

The various features illustrated in the drawings may be, but are not necessarily, drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," among others).

Relative terms used in the present disclosure and especially in the appended claims (e.g., bodies of the appended claims) are generally intended as falling within manufacturing tolerances and/or within scope reasonably understood by a person of skill in the art. For example, if two components are identified as being the "same" size, there may be variations consistent with manufacturing variances. Terms describing "approximately," "similar," "substantially," or other terms designating similarity may convey within ten percent of the comparative value. For example, two components that are approximately the same size would be understood to be of a size within ten percent of each other.

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. An instrument for ensuring proper pile installation in photovoltaic (PV) systems, the instrument comprising:
   a laser assembly configured to output a first beam in a first direction and a second beam in a second direction, wherein the second beam indicates an angular tolerance of a torque tube; and
   a mounting interface configured to position the laser assembly on a mounting pile.

2. The instrument of claim 1, wherein the laser assembly includes a first laser that projects the first beam in a first direction and the second beam in the second direction.

3. The instrument of claim 1, wherein the laser assembly is configured to output the first beam as a point beam and the second beam as an area beam, the area indicated by the area beam indicating the angular tolerance of the torque tube.

4. The instrument of claim 3, wherein the laser assembly includes a lens configured to output the second beam as the area beam.

5. The instrument of claim 4, wherein the area beam is conically shaped.

6. The instrument of claim 4, wherein the lens is an axicon lens.

7. The instrument of claim 1, wherein the laser assembly is further configured to output a third beam in a third direction, the second direction and the third direction being offset from parallel with the first direction by a combined offset amount that indicates an angular tolerance of a torque tube.

8. The instrument of claim 7, wherein the laser assembly includes:
   a first laser configured to project an input beam; and
   a beam splitting device configured to split the input beam into the second beam and the third beam.

9. The instrument of claim 8, wherein the beam splitting device is a prism and wherein the first laser or a second laser that projects the first beam in the first direction.

10. The instrument of claim 7, wherein the laser assembly includes a first laser configured to project the first beam in the first direction, a second laser configured to project the second beam in the second direction, and a third laser configured to project the third beam in the third direction.

11. The instrument of claim 10, further comprising a body connected to the mounting interface and housing the first laser, the second laser, and a third laser wherein the body is configured such that the first beam is projected through a first bore in the body, the second beam is projected through a second bore in the body, and the third beam is projected through a third bore in the body.

12. The instrument of claim 7, wherein the second and third directions are offset from parallel with the first direction by the same amount.

13. The instrument of claim 7, wherein the second and third directions are offset from parallel with the first direction by a combined amount that is less than 1 degree, less than 2 degrees, or less than 3 degrees.

14. The instrument of claim 1, wherein the instrument includes a scope and the laser assembly is configured to project the second beam as a reticle that indicates the angular tolerance of the torque tube via the scope.

15. A system for ensuring proper pile installation in photovoltaic (PV) systems comprising:
   a laser assembly that outputs a first beam in a first direction and a second beam in a second direction, wherein the second beam indicates an angular tolerance of a torque tube;
   a mounting pile coupled to the laser assembly;
   an alignment pile aligned with the first beam such that the second beam indicates the angular tolerance of a torque tube as a reference for a subject pile, the mounting pile positioned between the alignment pile and the subject pile.

16. The system of claim 15, wherein the laser assembly is configured to output the first beam as a point beam and the second beam as an area beam, the area indicated by the area beam indicating the angular tolerance of the torque tube.

17. The system of claim 16, wherein the laser assembly includes a lens configured to output the second beam as the area beam.

18. The system of claim 15, wherein the laser assembly outputs a third beam in a third direction, the second direction and the third direction being offset from parallel with the first direction by a combined offset amount that indicates the angular tolerance of a torque tube.

19. A method of ensuring proper pile installation in a photovoltaic system comprising:
   positioning an instrument on a surface of a mounting pile wherein the instrument includes a laser assembly that outputs a first beam in a first direction and a second beam in a second direction, wherein the second beam indicates an angular tolerance of a torque tube;
   aligning the first beam with a point on an alignment pile; and
   using the second beam as a reference to determine whether a subject pile is in compliance with the angular tolerance of the torque tube.

20. The method of claim 19, wherein the laser assembly outputs a third beam in a third direction, the second direction and the third direction being offset from parallel with the first direction by a combined offset amount that indicates the angular tolerance of a torque tube.

* * * * *